(12) United States Patent
Yu et al.

(10) Patent No.: US 11,936,472 B2
(45) Date of Patent: Mar. 19, 2024

(54) COMMUNICATION METHOD AND COMMUNICATIONS APPARATUS FOR IMPROVING RELIABILITY OF DATA TRANSMISSION

(71) Applicant: Huawei Technologies Co., Ltd., Shenzhen (CN)

(72) Inventors: Feng Yu, Beijing (CN); Bo Lin, Shenzhen (CN); Yexing Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 17/334,318

(22) Filed: May 28, 2021

(65) Prior Publication Data

US 2021/0288747 A1 Sep. 16, 2021

Related U.S. Application Data

(63) Continuation of application No. PCT/CN2019/115248, filed on Nov. 4, 2019.

(30) Foreign Application Priority Data

Nov. 30, 2018 (CN) .......................... 201811458547.0

(51) Int. Cl.
*H04L 1/00* (2006.01)
*H04W 24/04* (2009.01)
(Continued)

(52) U.S. Cl.
CPC ............ *H04L 1/0017* (2013.01); *H04W 24/04* (2013.01); *H04W 28/0268* (2013.01); *H04W 28/04* (2013.01)

(58) Field of Classification Search
None
See application file for complete search history.

(56) References Cited

U.S. PATENT DOCUMENTS

2013/0021982 A1 1/2013 Kim et al.
2015/0305041 A1 10/2015 Kim
(Continued)

FOREIGN PATENT DOCUMENTS

CN 106550470 A 3/2017
CN 107734547 A 2/2018
(Continued)

OTHER PUBLICATIONS

Oppo, "Discussion on DRB IP failure handling and data recovery," 3GPP TSG-RAN2#101bis, Sanya, P. R. China, R2-1804554, total 5 pages, 3rd Generation Partnership Project, Valbonne, France (Apr. 16-20, 2018).

(Continued)

*Primary Examiner* — Noel R Beharry
*Assistant Examiner* — Angelie T Ngo
(74) *Attorney, Agent, or Firm* — Leydig, Voit & Mayer, Ltd.

(57) ABSTRACT

A communication method includes: a first device obtains transmission states of first n data packets by using a first protocol layer entity, where the first protocol layer entity includes a radio link control (RLC) layer entity or an entity above an RLC layer; the first device starts a timer if transmission states of m data packets in the first n data packets are transmission failures, where n and m are both positive integers, and m is less than or equal to n; and the first device determines a radio resource configuration parameter used to transmit a subsequent data packet, or sends a first message to a second device, where the first message is used to indicate a state of the timer, and the state of the timer (Continued)

is used to determine the radio resource configuration parameter used to transmit the subsequent data packet.

20 Claims, 3 Drawing Sheets

(51) Int. Cl.
*H04W 28/02* (2009.01)
*H04W 28/04* (2009.01)

(56) References Cited

U.S. PATENT DOCUMENTS

| | | | |
|---|---|---|---|
| 2018/0098250 A1 | 4/2018 | Vrzic et al. | |
| 2019/0253949 A1* | 8/2019 | Park | H04B 7/0695 |
| 2020/0059817 A1* | 2/2020 | Baek | H04W 28/0273 |
| 2020/0382994 A1* | 12/2020 | Fujishiro | H04L 1/08 |
| 2021/0410166 A1* | 12/2021 | Shrestha | H04L 5/0055 |
| 2023/0007527 A1* | 1/2023 | Baek | H04W 28/0268 |

FOREIGN PATENT DOCUMENTS

| | | |
|---|---|---|
| EP | 1379033 A1 | 1/2004 |
| WO | 2014166053 A1 | 10/2014 |
| WO | 2017034510 A1 | 3/2017 |
| WO | 2017216510 A1 | 12/2017 |
| WO | 2018059557 A1 | 4/2018 |
| WO | 2018171540 A1 | 9/2018 |

OTHER PUBLICATIONS

Yang Peng et al., "Delay-aware scheduling algorithm for enhancing video services QoS in the LTE," vol. 42 No. 2, total 6 pages (Apr. 2015). With English abstract.

"3rd Generation Partnership Project; Technical Specification Group Services and System Aspects; Service requirements for the 5G system; Stage 1 (Release 16)," 3GPP TS 22.261 V16.5.0, total 67 pages, 3rd Generation Partnership Project, Valbonne, France (Sep. 2018).

Oppo, "Discussion on the data recovery due to DRB IP failure," 3GPP TSG-RAN2#100, Reno, USA, R2-1712249, total 4 pages, 3rd Generation Partnership Project, Valbonne, France (Nov. 27-Dec. 1, 2017).

Songhua, "Research on VoLTE Radio Perceived Packet Loss and Poor-QoE Cells," total 5 pages (2017). With English abstract.

"3rd Generation Partnership Project; Technical Specification Group Radio Access Network; NR; Radio Resource Control (RRC) protocol specification(Release 15)," 3GPP TS 38.331 V15.3.0, total 445 pages, 3rd Generation Partnership Project, Valbonne, France (Sep. 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, total 918 pages, 3rd Generation Partnership Project, Valbonne, France (Sep. 2018).

* cited by examiner

COMMUNICATION METHOD AND COMMUNICATIONS APPARATUS FOR IMPROVING RELIABILITY OF DATA TRANSMISSION

CROSS-REFERENCE TO RELATED APPLICATIONS

This application is a continuation of International Application No. PCT/CN2019/115248, filed on Nov. 4, 2019, which claims priority to Chinese Patent Application No. 201811458547.0, filed on Nov. 30, 2018. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

In a 3rd generation partnership project (3GPP) release 15 (R15), an indicator of an air interface of an ultra-reliable low-latency communication (URLLC) service is set as a requirement that a 1-millisecond (ms) latency plus 99.999% reliability needs to be ensured on a user plane. In the conventional technology, a time to live is set at an application layer of the URLLC service, to avoid relatively great impact on the application layer caused by an occasional communication error at a network layer. The time to live means that if the application layer does not receive a data packet within a time range in which the data packet is expected to arrive, the application layer starts a time-to-live timer. If an expected data packet arrives at the application layer in a running process of the timer, the timer stops. If the timer keeps running until the timer expires, to be specific, no expected data packet arrives at the application layer during a time period in which the time-to-live timer is active, interruption occurs at the application layer. In this case, the application layer enters a predefined state after interruption occurs at the application layer, which affects a normal application layer service.

Therefore, how to avoid interruption occurs at the application layer and improve reliability of data transmission is a technical problem that needs to be urgently resolved currently.

SUMMARY

Embodiments of this application provide a communication method and a communications apparatus, to improve a success rate of data packet transmission, thereby avoiding interruption occurs at an application layer and improving data transmission reliability.

A first aspect of this application provides a communication method, including:

A first device obtains transmission states of first n data packets by using a first protocol layer entity, where the first protocol layer entity includes a radio link control (RLC) layer entity or an entity above an RLC layer;

the first device starts a timer if transmission states of m data packets in the first n data packets are transmission failures, where n and m are both positive integers, and m is less than or equal to n; and the first device determines a radio resource configuration parameter used to transmit a subsequent data packet, or sends a first message to a second device, where the first message is used to indicate a state of the timer, and the state of the timer is used to determine the radio resource configuration parameter used to transmit the subsequent data packet.

In this solution, the first protocol layer entity includes the RLC layer entity or the entity above the RLC layer, for example, a service data adaptation protocol (SDAP) layer or a packet data convergence protocol (PDCP) layer, or may include another entity that has a same function as the RLC layer entity or the entity above the RLC layer.

In the foregoing solution, because the first device determines that the transmission states of the m data packets in the first n data packets are transmission failures, the first device starts the timer, and adjusts the radio resource configuration parameter of the subsequent data packet transmitted in a running process of the timer, to improve a success rate of data packet transmission. In this way, interruption occurring at an application layer can be avoided, and data transmission reliability can be improved.

In a possible implementation, that the first device determines a radio resource configuration parameter used to transmit a subsequent data packet includes:

When the first device determines that q data packets fail to be transmitted within a preset time period during running of the timer, the first device adjusts a radio resource configuration parameter used to transmit a to-be-transmitted data packet, where the to-be-transmitted data packet is a data packet sent after the $q^{th}$ data packet that fails to be transmitted within the preset time period, and q is a positive integer greater than 0; or the first device adjusts, during running of the timer, a radio resource configuration parameter used to transmit a data packet within the preset time period.

In the foregoing solution, the q data packets may be consecutive data packets, or may be inconsecutive data packets. If the q data packets are inconsecutive data packets, and the first device determines that q data packets fail to be transmitted accumulatively within the preset time period during running of the timer, the first device adjusts the radio resource configuration parameter used to transmit the to-be-transmitted data packet.

Because the radio resource configuration parameter used to transmit the to-be-transmitted data packet is adjusted, it can be ensured that a data packet sent after the $q^{th}$ data packet that fails to be transmitted within the preset time period is successfully transmitted, so that interruption occurring at the application layer can be avoided, and data transmission reliability can be improved.

In addition, the first device may alternatively start to adjust the radio resource configuration parameter once the timer is started.

Because the radio resource configuration parameter used to transmit the data packet within the preset time period is adjusted, it can be ensured that the data packet transmitted within the preset time period is successfully transmitted, so that interruption occurring at the application layer can be avoided, and data transmission reliability can be improved.

In a possible implementation, the first device obtains a transmission state of each data packet based on one of the following information by using the first protocol layer entity:

when the timer maintained by the first device by using the first protocol layer entity does not expire and the data packet is successfully transmitted, the first device determines that the transmission state of the data packet is a transmission success; otherwise, the first device determines that the transmission state of the data packet is a transmission failure;

a second device sends first indication information to the first protocol layer entity of the first device by using the first protocol layer entity, where the first indication information is used to indicate that the data packet is successfully transmitted or fails to be transmitted;

the first device sends second indication information to the first protocol layer entity of the first device by using a second protocol layer entity, where the second indication information is used to indicate that the data packet is successfully transmitted or fails to be transmitted;

the second device sends third indication information to the first protocol layer entity of the first device by using a second protocol layer entity, where the third indication information is used to indicate that the data packet is successfully transmitted or fails to be transmitted;

the second device obtains, by using the first protocol layer entity or by using a second protocol layer entity, sequence numbers of all received data packets, and if the second device determines that the sequence number of the data packet is missing, determines that the data packet fails to be transmitted; or the second device learns of a transmission latency based on quality of service (QoS) information by using the first protocol layer entity or by using a second protocol layer entity; and if the data packet is not correctly transmitted within the transmission latency, determines that the data packet fails to be transmitted.

In the foregoing solution, the first device maintains the timer by using a PDCP layer. If the data packet is successfully transmitted in the running process of the timer, it may be determined that the transmission state of the data packet is a transmission success. If the timer expires, regardless of whether the data packet is successfully transmitted, it is considered that the transmission state of the data packet is a transmission failure; or if the timer does not expire, but the data packet is not successfully transmitted, it may also be determined that the transmission state of the data packet is a transmission failure.

Alternatively, the second device sends the first indication information to the PDCP layer of the first device by using the PDCP layer, where the first indication information indicates the transmission state of the data packet. For example, if a bit state of the first indication information is 0, it indicates that the data packet fails to be transmitted; or if a bit state of the first indication information is 1, it indicates that the data packet is successfully transmitted.

Alternatively, the first device sends the second indication information to the PDCP layer of the first device by using a media access control (MAC) layer of the first device, where the second indication information indicates the transmission state of the data packet. For example, if a bit state of the second indication information is 0, it indicates that the data packet fails to be transmitted; or if a bit state of the second indication information is 1, it indicates that the data packet is successfully transmitted.

Alternatively, the second device sends the third indication information to the PDCP layer of the first device by using a MAC layer of the second device, where the third indication information indicates the transmission state of the data packet. For example, if a bit state of the third indication information is 0, it indicates that the data packet fails to be transmitted; or if a bit state of the third indication information is 1, it indicates that the data packet is successfully transmitted.

Alternatively, the second device obtains the sequence numbers of all the received data packets by using the PDCP layer of the second device or by using a MAC layer of the second device. If the second device determines that the sequence numbers of all the received data packets are consecutive, the second device determines that the data packets are successfully transmitted. If the second device determines that the sequence number of the received data packet is missing, the second device determines that the data packet fails to be transmitted. Further, the second device may determine that a transmission state of the data packet corresponding to the missing sequence number is a transmission failure.

Alternatively, the quality of service (QoS) information includes at least one of a transmission latency parameter, a reliability parameter, a jitter parameter, or a service period parameter. The second device may learn of the transmission latency based on the QoS information by using the PDCP layer or the MAC layer, that is, learn of a latency range of data packet transmission. If the second device determines that the data packet is not correctly transmitted within the transmission latency, the second device may determine that the transmission state of the data packet is a transmission failure. If the second device determines that the data packet is successfully transmitted within the transmission latency, the second device considers that the transmission state of the data packet is a transmission success.

In a possible implementation, the radio resource configuration parameter includes at least one of the following:

a modulation and coding scheme;

a maximum quantity of retransmissions of a hybrid automatic repeat request (HARQ);

a maximum quantity of retransmissions of an automatic repeat request (ARQ);

a size of a transmission resource;

a type of a transmission resource;

a priority of a logical channel;

an RLC layer transmission mode of a radio bearer;

a type of a radio bearer; or a transmit power.

In the foregoing solution, the radio resource configuration parameter may further include all parameters in a radio resource control (RRC) reconfiguration message.

In a possible implementation, the method further includes:

When determining that p data packets are successfully transmitted within the preset time period during running of the timer, the first device processes the timer in any one of the following manners:

resetting, stop, suspension, or interruption.

In the foregoing solution, resetting of the timer means that the timer is resumed to an initial setting (for example, be cleared) and keeps running. In this case, the timer maintains in an active state, but restarts timing.

Stop of the timer, may also be referred to as termination of the timer, and means that the timer is resumed to an initial setting and stops running. In this case, the timer changes from an active state to an inactive state, and can only be restarted subsequently.

Suspension of the timer may also be referred to as interruption/breaking off of the timer, and means that the timer is not cleared and stops running. In this case, the timer changes from an active state to an inactive state, but maintains a current state, and may be resumed to run.

In a possible implementation, the first device is a terminal device, and the second device is a network device; and the first device receives fourth indication information from the second device or a third device, and the fourth indication information includes a parameter of the timer corresponding to a radio bearer or a QoS service flow.

In the foregoing solution, the parameter of the timer may include duration of the timer, a protocol layer entity that maintains the timer, and/or the like. The terminal device receives, from the network device or a core network device, the parameter of the timer corresponding to the radio bearer or the QoS service flow, to start the timer based on the parameter of the timer, and maintain the timer based on the protocol layer entity that maintains the timer.

In a possible implementation, the first device is a terminal device, and the second device is a network device; and the first device sends fifth indication information to the second device or a third device, and the fifth indication information includes a parameter of the timer corresponding to a radio bearer or a QoS service flow.

In the foregoing solution, the parameter of the timer may include duration of the timer, a protocol layer entity that maintains the timer, and/or the like. The terminal device may send, to the network device or a core network device, the parameter of the timer corresponding to the radio bearer or the QoS service flow, so that the network device or the core network device configures and maintains the timer based on the parameter of the timer.

In a possible implementation, the method further includes:

When determining that at least p data packets are not successfully transmitted within the preset time period during running of the timer, the first device releases the radio bearer or the QoS service flow.

In the foregoing solution, when the network device determines that a quantity of data packets that are successfully transmitted during running of the timer is less than p, or a quantity of data packets that are incorrectly transmitted is greater than q, the network device sends an RRC reconfiguration message to the terminal device. The RRC reconfiguration message includes release indication information of a radio bearer corresponding to the service, to indicate to release the bearer corresponding to the service.

In a possible implementation, the first device is the terminal device, and the second device is the network device; and that the first device determines a radio resource configuration parameter used to transmit a subsequent data packet includes:

the first device adjusts, based on first parameter information configured by the second device, the radio resource configuration parameter used to transmit the subsequent data packet.

In this solution, after starting the timer, the terminal device may adjust the radio resource configuration parameter based on the first parameter information, to transmit, based on the adjusted radio resource configuration parameter, a data packet within the preset time period during running of the timer.

In a possible implementation, the first device is the terminal device, and the second device is the network device; and that the first device determines a radio resource configuration parameter used to transmit a subsequent data packet includes:

the first device adjusts, based on second parameter information configured by the second device, the radio resource configuration parameter used to transmit a data packet when the timer is in a disabled state.

When the timer is in the disabled state, the terminal device adjusts the radio resource configuration parameter based on the second parameter information preconfigured by the network device, to transmit, based on the adjusted radio resource configuration parameter, the data packet when the timer is in the disabled state.

In a possible implementation, the first device is the terminal device, and the second device is the network device; and that the first device determines a radio resource configuration parameter used to transmit a subsequent data packet includes:

the first device receives a second message from the second device, where the second message includes a to-be-adjusted parameter; and the first device adjusts, based on the to-be-adjusted parameter, the radio resource configuration parameter used to transmit the subsequent data packet.

In the foregoing solution, after starting the timer, the terminal device sends a started state of the timer to the network device. When determining that the timer is in the started state, the network device sends the second message to the terminal device. The second message is a radio resource control (RRC) reconfiguration message.

In addition, the to-be-adjusted parameter may include at least one of a modulation and coding scheme, a HARQ, an ARQ, a size of a transmission resource, a type of a transmission resource, a priority of a logical channel, an RLC layer transmission mode of a radio bearer, a type of a radio bearer, or a transmit power, and the to-be-adjusted parameter may further include all parameters in the RRC reconfiguration message.

A second aspect of this application provides a communications apparatus, including:

a processing unit, configured to obtain transmission states of first n data packets by using a first protocol layer entity, where the first protocol layer entity includes a radio link control RLC layer entity or an entity above an RLC layer, where the processing unit is further configured to start a timer when transmission states of m data packets in the first n data packets are transmission failures, where n and m are both positive integers, and m is less than or equal to n; and the processing unit is further configured to determine a radio resource configuration parameter used to transmit a subsequent data packet; or a sending unit, configured to send a first message to a second device, where the first message is used to indicate a state of the timer, and the state of the timer is used to determine the radio resource configuration parameter used to transmit the subsequent data packet.

In a possible implementation, the processing unit is specifically configured to:

when determining that q data packets fail to be transmitted within a preset time period during running of the timer, adjust a radio resource configuration parameter used to transmit a to-be-transmitted data packet, where the to-be-transmitted data packet is a data packet sent after the $q^{th}$ data packet that fails to be transmitted within the preset time period, and q is a positive integer greater than 0; or adjust, during running of the timer, a radio resource configuration parameter used to transmit a data packet within the preset time period.

In a possible implementation, the processing unit obtains a transmission state of each data packet based on one of the following information by using the first protocol layer entity:

when the timer maintained by the apparatus by using the first protocol layer entity does not expire and the data packet is successfully transmitted, the apparatus determines that the transmission state of the data packet is a transmission success; otherwise, the apparatus determines that the transmission state of the data packet is a transmission failure;

a second device sends first indication information to the first protocol layer entity of the apparatus by using the first protocol layer entity, where the first indication information is used to indicate that the data packet is successfully transmitted or fails to be transmitted;

the apparatus sends second indication information to the first protocol layer entity of the apparatus by using a second protocol layer entity, where the second indication information is used to indicate that the data packet is successfully transmitted or fails to be transmitted;

the second device sends third indication information to the first protocol layer entity of the apparatus by using a second protocol layer entity, where the third indication information is used to indicate that the data packet is successfully transmitted or fails to be transmitted;

the second device obtains, by using the first protocol layer entity or by using a second protocol layer entity, sequence numbers of all received data packets, and if the second device determines that the sequence number of the data packet is missing, determines that the data packet fails to be transmitted; or the second device learns of a transmission latency based on quality of service QoS information by using the first protocol layer entity or by using a second protocol layer entity; and if the data packet is not correctly transmitted within the transmission latency, determines that the data packet fails to be transmitted.

In a possible implementation, the radio resource configuration parameter includes at least one of the following:

a modulation and coding scheme;

a maximum quantity of retransmissions of a hybrid automatic repeat request (HARQ);

a maximum quantity of retransmissions of an automatic repeat request (ARQ);

a size of a transmission resource;

a type of a transmission resource;

a priority of a logical channel;

an RLC layer transmission mode of a radio bearer;

a type of a radio bearer; or a transmit power.

In a possible implementation, the processing unit is further configured to: when determining that p data packets are successfully transmitted within the preset time period during running of the timer, process the timer in any one of the following manners:

resetting, stop, suspension, or interruption.

In a possible implementation, the apparatus is a terminal device, and the second device is a network device; and the apparatus further includes a receiving unit, where the receiving unit is further configured to receive fourth indication information from the second device or a third device, and the fourth indication information includes a parameter of the timer corresponding to a radio bearer or a QoS service flow.

In a possible implementation, the apparatus is a terminal device, and the second device is a network device; and the sending unit is further configured to send fifth indication information to the second device or a third device, and the fifth indication information includes a parameter of the timer corresponding to a radio bearer or a QoS service flow.

In a possible implementation, the processing unit is further configured to: when determining that at least p data packets are not successfully transmitted within the preset time period during running of the timer, release the radio bearer or the QoS service flow.

In a possible implementation, the apparatus is the terminal device, and the second device is the network device; and the processing unit is specifically configured to:

adjust, based on first parameter information configured by the second device, the radio resource configuration parameter used to transmit the subsequent data packet.

In a possible implementation, the apparatus is the terminal device, and the second device is the network device; and the processing unit is specifically configured to:

adjust, based on second parameter information configured by the second device, the radio resource configuration parameter used to transmit a data packet when the timer is in a disabled state.

In a possible implementation, the apparatus is the terminal device, and the second device is the network device; and the processing unit is specifically configured to:

receive a second message from the second device, where the second message includes a to-be-adjusted parameter; and adjust, based on the to-be-adjusted parameter, the radio resource configuration parameter used to transmit the subsequent data packet.

A third aspect of this application provides a computer-readable storage medium, where the computer-readable storage medium stores a computer program; and when the program is executed by a processor, the communication method according to the first aspect is implemented.

A fourth aspect of this application provides a communications apparatus, including a memory, a processor, and a program that is stored in the memory and that can be run on the processor, where when the processor executes the program, the communication method according to the first aspect is implemented.

According to the communication method and the communications apparatus provided in the embodiments of this application, the first device obtains the transmission states of the first n data packets by using the first protocol layer entity, where the first protocol layer entity includes the RLC layer entity or the entity above the RLC layer; the first device starts the timer if the transmission states of the m data packets in the first n data packets are transmission failures, where n and m are both positive integers, and m is less than or equal to n; and the first device determines the radio resource configuration parameter used to transmit the subsequent data packet, or sends the first message to the second device, where the first message is used to indicate the state of the timer, and the state of the timer is used to determine the radio resource configuration parameter used to transmit the subsequent data packet. Because the first device determines that the transmission states of the m data packets in the first n data packets are transmission failures, the first device starts the timer, and adjusts the radio resource configuration parameter of the subsequent data packet transmitted in the running process of the timer, to improve a success rate of data packet transmission. In this way, interruption occurring at the application layer can be avoided, and data transmission reliability can be improved.

DESCRIPTION OF EMBODIMENTS

Figure 1:
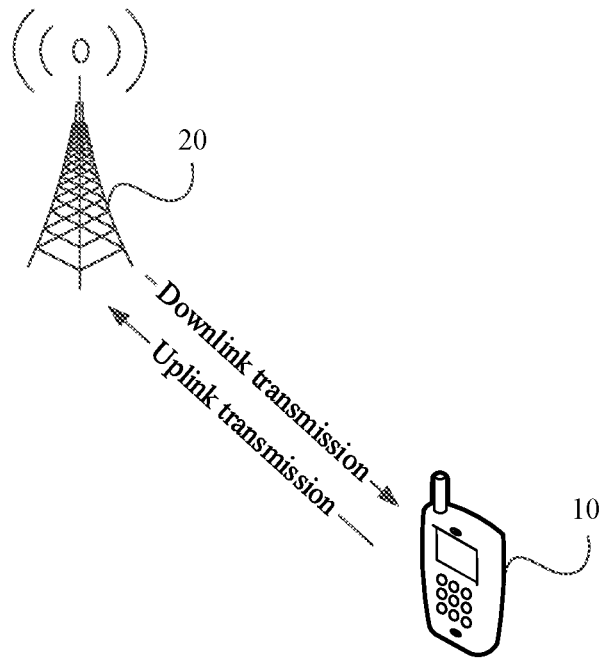
FIG. 1 is a schematic diagram of a possible system architecture according to an embodiment of this application.

The following first describes a first device and a second device in this application, to help a person skilled in the art have a better understanding.

In this application, the first device may be a terminal device, and the second device is a network device. Alternatively, when the first device is a network device, the second device may be a terminal device. Certainly, the first device and the second device may alternatively be other devices that need to adjust radio resource configuration parameters of subsequent data packets based on transmission states of first n data packets.

(1) A terminal device may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in a wireless local area network (WLAN), a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, a wearable device, a terminal device in a next generation communications system, for example, a 5th generation (5G) communications network, a terminal device in a future evolved public land mobile network (PLMN), a terminal device in a new radio (NR) communications system, or the like.

By way of example, and not limitation, in the embodiments of this application, the terminal device may alternatively be a wearable device. The wearable device may also be referred to as a wearable intelligent device, and is a generic term for wearable devices such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but implements powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

(2) A network device may be a device configured to communicate with a mobile device. The network device may be an access point (AP) in a WLAN system, a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in a long term evolution (LTE) system, a network relay station or a network access point, a vehicle-mounted device, a wearable device, a network device in a future 5G network or a network device in a future evolved PLMN network, a next generation base station (gNodeB) in an NR system, or the like.

(3) In the embodiments of this application, a first protocol layer entity may include a radio link control (RLC) layer entity or an entity above an RLC layer. The entity above the RLC layer includes an entity above the RLC layer in an access stratum (AS), for example, a service data adaptation protocol (SDAP) layer and a packet data convergence protocol (PDCP) layer, or may include a protocol layer in a non-access stratum (NAS), or may include another entity that has a same or similar function as the RLC layer entity or the entity above the RLC layer.

In addition, the first protocol layer entity may further include a media access control (MAC) layer or a physical (PHY) layer.

(4) In this application, "at least one" may mean one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item of the following" or a similar expression thereof means any combination of these items, including a singular item or any combination of plural items. For example, at least one item of a, b, or c may indicate a, b, c, a and b, a and c, b and c, or a, b, and c, where a, b, and c may be singular or plural. A range described in "above", "below", or the like includes boundary points.

(5) A unit in this application is a functional unit or a logical unit. The unit may be in a form of software, and a processor executes program code to implement a function of the unit; or the unit may be in a form of hardware.

A person skilled in the art may understand that the communication method provided in the embodiments of this application may be applied to a fourth generation mobile communication technology (4G), a fifth generation mobile communication technology (5G), or a future evolved communications system, or may be applied to another wireless communications system. The wireless communications system may be a system to which various radio access technologies (RAT) are applied, for example, a code division multiple access (CDMA) system, a time division multiple access (TDMA) system, a frequency division multiple access (FDMA) system, an orthogonal frequency division multiple access (OFDMA) system, or a single carrier frequency division multiple access (SC-FDMA) system, or another system. For example, the wireless communications system may be a long term evolution (LTE) system, a CDMA system, a wideband code division multiple access (WCDMA) system, a global system for mobile communications (GSM) system, a wireless local area network (WLAN) system, a new radio (NR) system, various evolved or converged systems, and a system using a future-oriented communications technology.

FIG. 1 is a schematic diagram of a possible system architecture according to an embodiment of this application. As shown in FIG. 1, the system includes a terminal device 10 and a network device 20. The terminal device 10 may be, for example, a UE, and the network device 20 may be a base station. When a first device is the terminal device 10, a second device is the network device 20. Alternatively, when a first device is the network device 20, a second device may be the terminal device 10.

It should be noted that, for brevity, FIG. 1 shows communication between only one network device 20 (for example, a base station) and one terminal device 10 (for example, UE). Usually, the wireless communications system may include any quantity of network devices and terminal devices. In addition, the wireless communications system may further include one or more core network devices, one or more devices configured to bear a virtualized network function, or the like.

In an existing communications system, a time to live is set at an application layer of a URLLC service, to avoid relatively great impact on the application layer caused by an occasional communication error at a network layer. The time to live means that if the application layer does not receive a data packet within a time range in which the data packet is expected to arrive, the application layer starts a time-to-live timer. If an expected data packet arrives at the application layer in a running process of the timer, the timer stops. If the timer keeps running until the timer expires, to be specific, no expected data packet arrives at the application layer during a time period in which the time-to-live timer is active, interruption occurs at the application layer. In this case, the application layer enters a predefined state after interruption occurs at the application layer, which affects a normal application layer service. The application layer is a protocol layer that directly processes service data generated by application software, and the network layer is a lower-layer protocol layer of the application layer, for example, may be any protocol layer defined in 3GPP, and is used to transmit service data.

In consideration of these cases, an embodiment of this application provides a communication method. In the method, a first device obtains transmission states of first n data packets by using a first protocol layer entity, the first protocol layer entity includes an RLC layer entity or an entity above an RLC layer, and the data packet may be a data packet on a same radio bearer or in a same service flow. The radio bearer includes a data radio bearer and a signaling radio bearer. The first device starts a timer if transmission states of m data packets in the first n data packets are transmission failures. n and m are both positive integers, and m is less than or equal to n. The first device determines a radio resource configuration parameter used to transmit a subsequent data packet, or sends a first message to a second device, the first message is used to indicate a state of the timer, and the state of the timer is used to determine the radio resource configuration parameter used to transmit the subsequent data packet. Because the first device determines that the transmission states of the m data packets in the first n data packets are transmission failures, the first device starts the timer, and adjusts the radio resource configuration parameter of the subsequent data packet transmitted in a running process of the timer, to improve a success rate of data packet transmission. In this way, interruption occurring at the application layer can be avoided, and data transmission reliability can be improved.

In addition, this embodiment of this application further provides a communication method. In the method, a first device obtains transmission states of first n data packets by using a first protocol layer entity, and the first protocol layer entity includes an RLC layer entity or an entity above an RLC layer. The first device starts a counter if transmission states of m data packets in the first n data packets are transmission failures. n and m are both positive integers, and m is less than or equal to n. After the timer is started, the counter is increased or decreased by 1 each time a data packet fails to be transmitted subsequently. The first device determines a radio resource configuration parameter used to transmit a subsequent data packet, or sends a third message to a second device after a value of the counter reaches a threshold, where the threshold may be configured by a core network device or a network device. The third message is used to indicate the value of the counter, and the value of the counter is used to determine the radio resource configuration parameter used to transmit the subsequent data packet. Because the first device determines that the transmission states of the m data packets in the first n data packets are transmission failures, the first device starts the counter, and adjusts the radio resource configuration parameter of the subsequent data packet transmitted in a counting process of the counter, to improve a success rate of data packet transmission. In this way, interruption occurring at the application layer can be avoided, and data transmission reliability can be improved.

Figure 2:
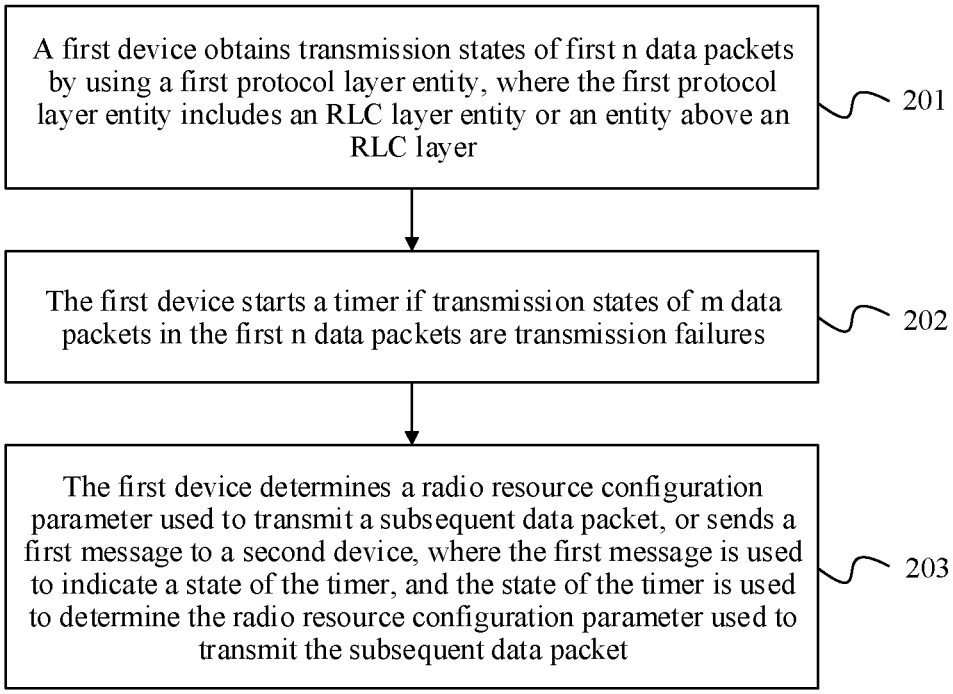
FIG. 2 is a schematic flowchart of a data transmission method according to this application.

FIG. 2 is a schematic flowchart of a data transmission method according to this application. Based on the system architecture shown in FIG. 1, as shown in FIG. 2, the method in this embodiment may include the following steps.

Step 201: A first device obtains transmission states of first n data packets by using a first protocol layer entity, where the first protocol layer entity includes an RLC layer entity or an entity above an RLC layer.

The data packet may be a data packet on a same radio bearer or in a same service flow. The radio bearer includes a data radio bearer and a signaling radio bearer. The data packet may be a service data unit (SDU) or a protocol data unit (PDU) of the first protocol layer entity. For example, the service flow includes a service flow or a QoS flow, and is a bearer of service data packets having a same type of QoS requirement.

In addition, the data packet may also be an application layer data packet, or may be an internet protocol (IP) packet, or an ethernet packet. In conclusion, the data packet may be a data packet above a network layer, and arrives at the network layer as a service data unit (SDU) of the network layer.

It should be noted that the ethernet packet and the IP packet have different encapsulation formats. The ethernet packet is encapsulated based on an ethernet protocol, and the IP packet is encapsulated based on an IP protocol.

In addition, n may be a positive integer, for example, may be 1, 2, 3, 4, or 5. The first device may obtain the transmission states of the first n data packets by using the first protocol layer entity, for example, may obtain transmission states of first two or three data packets, and the transmission states of the data packets include transmission successes or transmission failures.

Optionally, the first protocol layer entity includes the RLC layer entity or the entity above the RLC layer, for example, an SDAP layer or a PDCP layer, or may include another entity that has a same function as the RLC layer entity or the entity above the RLC layer.

Further, the following uses an example in which the first protocol layer entity is a PDCP layer and a second protocol layer entity is a media access control (MAC) layer to describe in detail how the first device obtains a transmission state of each data packet. When the first protocol layer entity and the second protocol layer entity are other entities, a manner of obtaining the transmission state of the data packet is similar to the manner in which the first protocol layer entity is the PDCP layer and the second protocol layer entity is the MAC layer.

Manner 1: If a timer maintained by the first device by using the first protocol layer entity does not expire and the data packet is successfully transmitted, the first device determines that the transmission state of the data packet is a transmission success; otherwise, the first device determines that the transmission state of the data packet is a transmission failure.

Specifically, when the first device is a network device, if the timer maintained by the first protocol layer entity does not expire and a downlink data packet is successfully transmitted, the first device determines that a transmission state of the downlink data packet is a transmission success; otherwise, the first device determines that a transmission state of the downlink data packet is a transmission failure. When the first device is a terminal device, if the timer maintained by the first protocol layer entity does not expire and an uplink data packet is successfully transmitted, the first device determines that a transmission state of the uplink data packet is a transmission success; otherwise, the first device determines that a transmission state of the uplink data packet is a transmission failure.

The first device maintains the timer by using the PDCP layer. If the data packet is successfully transmitted in a running process of the timer, the first device may determine that the transmission state of the data packet is a transmission success. If the timer expires, regardless of whether the data packet is successfully transmitted, it is considered that the transmission state of the data packet is a transmission failure; or if the timer does not expire, but the data packet is not successfully transmitted, it may also be determined that the transmission state of the data packet is a transmission failure.

Expiration of the timer refers to a state after the timer reaches a threshold. The threshold may be specified in a protocol in advance, or may be configured in advance after the threshold is determined by using a message sent by a second device or based on an application layer of the first device.

In addition, the first device may further determine the transmission state of the data packet by using a counter. If the counter maintained by the first device by using the first protocol layer entity does not overflow and the data packet is successfully transmitted, the first device determines that the transmission state of the data packet is a transmission success; otherwise, the first device determines that the transmission state of the data packet is a transmission failure.

Specifically, the first device maintains the counter by using the PDCP layer. If the data packet is successfully transmitted in a counting process of the counter, the first device may determine that the transmission state of the data packet is a transmission success. If the counter overflows, regardless of whether the data packet is successfully transmitted, it is considered that the transmission state of the data packet is a transmission failure; or if the counter does not overflow, but the data packet is not successfully transmitted, it may also be determined that the transmission state of the data packet is a transmission failure.

Overflow of the counter refers to a state after the timer reaches a threshold. The threshold may be specified in a protocol in advance, or may be configured in advance after the threshold is determined by using a message sent by the second device or based on the application layer of the first device. The counter may count incrementally. For example, an initial value is 0. Each time a data packet that fails to be transmitted is determined, the counter is increased by 1. When the counter reaches a threshold X, it is considered that the counter overflows. Alternatively, an initial value of the counter may be set to Y (where Y is a non-zero positive integer). Each time a data packet that fails to be transmitted is determined, the counter is decreased by 1, and overflow occurs when the counter reaches a threshold 0.

Manner 2: The second device sends first indication information to the first protocol layer entity of the first device by using the first protocol layer entity, where the first indication information is used to indicate that the data packet is successfully transmitted or fails to be transmitted.

Specifically, the second device sends the first indication information to the PDCP layer of the first device by using the PDCP layer, and the first indication information indicates the transmission state of the data packet. For example, if a bit state of the first indication information is 0, it indicates that the data packet fails to be transmitted; or if a bit state of the first indication information is 1, it indicates that the data packet is successfully transmitted.

Optionally, the first indication information may alternatively be a PDCP status report, and the PDCP status report includes a serial number (SN) of at least one data packet and a corresponding transmission state.

Manner 3: The first device sends second indication information to the first protocol layer entity of the first device by using the second protocol layer entity, where the second indication information is used to indicate that the data packet is successfully transmitted or fails to be transmitted.

Optionally, the first device sends the second indication information to the PDCP layer of the first device by using the MAC layer of the first device, and the second indication information indicates the transmission state of the data packet. For example, if a bit state of the second indication information is 0, it indicates that the data packet fails to be transmitted; or if a bit state of the second indication information is 1, it indicates that the data packet is successfully transmitted.

Manner 4: The second device sends third indication information to the first protocol layer entity of the first device by using the second protocol layer entity, where the third indication information is used to indicate that the data packet is successfully transmitted or fails to be transmitted.

Specifically, the second device sends the third indication information to the PDCP layer of the first device by using the MAC layer of the second device, and the third indication information indicates the transmission state of the data packet. For example, if a bit state of the third indication information is 0, it indicates that the data packet fails to be transmitted; or if a bit state of the third indication information is 1, it indicates that the data packet is successfully transmitted.

Manner 5: The second device obtains, by using the first protocol layer entity or by using the second protocol layer entity, sequence numbers of all received data packets, and if the second device determines that the sequence number of the data packet is missing, determines that the data packet fails to be transmitted.

Specifically, the second device obtains the sequence numbers of all the received data packets by using the PDCP layer of the second device or by using the MAC layer of the second device. If the second device determines that the sequence numbers of all the received data packets are consecutive, the second device determines that the data packets are successfully transmitted. If the second device determines that the sequence number of the received data packet is missing, the second device determines that the data packet fails to be transmitted. Further, the second device may determine that a transmission state of the data packet corresponding to the missing sequence number is a transmission failure.

Manner 6: The second device learns of a transmission latency based on QoS information by using the first protocol layer entity or by using the second protocol layer entity; and if the data packet is not correctly transmitted within the transmission latency, determines that the data packet fails to be transmitted.

Specifically, the QoS information includes at least one of a transmission latency parameter, a reliability parameter, a jitter parameter, or a service period parameter. The second device may learn of the transmission latency based on the QoS information by using the PDCP layer or the MAC layer, that is, learn of a latency range of data packet transmission. If the second device determines that the data packet is not correctly transmitted within the transmission latency, the second device may determine that the transmission state of the data packet is a transmission failure. If the second device determines that the data packet is successfully transmitted within the transmission latency, the second device considers that the transmission state of the data packet is a transmission success.

It should be noted that the first device may obtain the transmission state of the data packet in any one of the foregoing manners, or may obtain the transmission state of the data packet in a combination of the foregoing two or more manners. A manner of obtaining the transmission state of the data packet is not limited in this embodiment of this application.

Step 202: The first device starts the timer if transmission states of m data packets in the first n data packets are transmission failures.

n and m are both positive integers, and m is less than or equal to n.

In this step, after obtaining the transmission states of the first n data packets, the first device determines whether the transmission states of the m data packets in the first n data packets are transmission failures, where the m data packets may be consecutive data packets, or may be inconsecutive data packets. In a specific implementation process, data packets with consecutive sequence numbers may be referred to as consecutive data packets, and data packets with inconsecutive sequence numbers may be referred to as inconsecutive data packets. For example, data packets with sequence numbers #1, #2, and #3 are consecutive data packets, and data packets with sequence numbers #1, #3, and #6 are inconsecutive data packets. When m=1, it may be considered that there is one consecutive data packet.

The first device may determine, by using the counter, whether the transmission states of the m data packets in the first n data packets are transmission failures. Specifically, before transmitting a data packet, the first device may initialize the counter. If a value of the counter is initialized to 0, the first device may increase the value of the counter by 1 each time the first device determines a data packet that fails to be transmitted. In a process of transmitting the first n data packets, if the value of the counter is increased to m, the first device may determine that the transmission states of the m data packets in the first n data packets are transmission failures. Alternatively, if a value of the counter is initialized to m (where m is a non-zero positive integer), the value of the counter may be decreased by 1 each time the first device determines a data packet that fails to be transmitted. In a process of transmitting the first n data packets, if the value of the counter is decreased to 0, the first device may determine that the transmission states of the m data packets in the first n data packets are transmission failures.

The first device starts the timer if the first device determines that the transmission states of the m data packets in the first n data packets are transmission failures. Duration of the timer may be set based on a time to live of an application layer service or an actual situation. For example, the duration of the timer may be n periodic service generation periodicities, where n may be 1, 2, or 5, or the duration of the timer may be a time period, for example, may be set to 1 ms, 2 ms, 5 ms, or the like. The duration of the timer is not limited in this embodiment of this application.

It should be noted that the time to live of the application layer service is obtained by a terminal device and/or a network device from a core network device, or may be obtained by a terminal device from an application layer of the terminal device and reported to a network device.

Start of the timer means that the timer changes from an inactive state to an active state and starts to run.

Optionally, if the first device is the terminal device, before starting the timer, the first device receives fourth indication information from the second device or a third device. The fourth indication information includes a parameter of the timer corresponding to a radio bearer or a QoS service flow.

Specifically, the second device may be the network device, and the third device may be the core network device. The parameter of the timer may include the duration of the timer, a protocol layer entity that maintains the timer, and/or the like. The terminal device receives, from the network device or the core network device, the parameter of the timer corresponding to the radio bearer or the QoS service flow, to start the timer based on the parameter of the timer, and maintain the timer based on the protocol layer entity that maintains the timer. The radio bearer includes the data radio bearer (DRB) and the signaling radio bearer (SRB).

Step 203: The first device determines a radio resource configuration parameter used to transmit a subsequent data packet, or sends a first message to the second device, where the first message is used to indicate a state of the timer, and the state of the timer is used to determine the radio resource configuration parameter used to transmit the subsequent data packet.

Optionally, the radio resource configuration parameter includes at least one of the following: a modulation and coding scheme (MCS), a maximum quantity of retransmissions of a hybrid automatic repeat request (HARQ), a maximum quantity of retransmissions of an automatic repeat request (ARQ), a size of a transmission resource, a type of a transmission resource, a priority of a logical channel, an RLC layer transmission mode of a radio bearer, a type of a radio bearer, or a transmit power. In addition, the radio resource configuration parameter may further include all parameters in a RRC reconfiguration message.

An MCS modulation and coding table is a representation form proposed in the institute of electrical and electronics engineers (IEEE) 802.11n to represent a physical transmission rate. The MCS uses a factor that affects a communication rate as a column of the table, and uses an MCS index as a row, to form a rate table. Therefore, each MCS index corresponds to a physical transmission rate in a group of parameters.

The maximum quantity of the retransmissions of the hybrid automatic repeat request, namely, the maximum quantity of retransmissions of the HARQ, indicates a maximum quantity of times that a same MAC protocol data unit (PDU) is transmitted at a MAC layer.

The maximum quantity of the retransmissions of the automatic repeat request, namely, the maximum quantity of the retransmissions of the ARQ, indicates a maximum quantity of times that a same RLC PDU is transmitted at an RLC layer.

The size of the transmission resource is, for example, a size of a semi-persistent scheduling (SPS) resource, or a quantity of time domain units or a quantity of frequency domain units occupied in time domain. Specifically, the time domain unit may be a symbol, a slot, a subframe, a frame, a superframe, or the like, and the frequency domain unit may be a carrier, a subcarrier, a bandwidth part (BWP), or the like.

The type of the transmission resource is, for example, an SPS resource, a grant-free resource, or a dynamic scheduling resource.

The priority of the logical channel is used to indicate a priority of each logical channel when the logical channel is multiplexed at a MAC layer. Different logical channels may have a same priority.

The RLC layer transmission mode of the radio bearer indicates whether a radio bearer uses an RLC unacknowledged mode (UM) or an RLC acknowledged mode (AM) for transmission.

There are three transmission modes at the RLC layer: an RLC AM transmission mode, an RLC UM transmission mode, and an RLC transparent mode (TM). The RLC AM transmission mode provides a reliable transmission service, and provides all RLC functions (including an ARQ function). The RLC UM transmission mode provides all RLC functions except retransmission and re-segmentation, and consequently provides an unreliable transmission service. The RLC TM transmission mode: In this mode, the RLC can be considered as null. No processing is performed on an RLC service data unit (SDU), and no RLC header is added. This is because only a data transparent transmission (pass-through) function is provided in this transmission mode.

The type of the radio bearer includes a data radio bearer (DRB) type and a signaling radio bearer (SRB) type. Further, different types may refer to having different DRB IDs and SRB IDs.

The transmit power indicates a transmit power used for sending a MAC PDU.

In a possible implementation, after the first device starts the timer, the first device determines the radio resource configuration parameter used to transmit the subsequent data packet in the running process of the timer.

When the first device adjusts the radio resource configuration parameter used to transmit the subsequent data packet may be determined in the following manners:

Manner 1: When the first device determines that q data packets fail to be transmitted within a preset time period during running of the timer, the first device adjusts a radio resource configuration parameter used to transmit a to-be-transmitted data packet, where the to-be-transmitted data packet is a data packet sent after the $q^{th}$ data packet that fails to be transmitted within the preset time period, and q is a positive integer greater than 0.

Specifically, when determining that the transmission states of the m data packets in the first n data packets are transmission failures, the first device starts the timer. If the q data packets fail to be transmitted within the preset time period in the running process of the timer, the first device adjusts the radio resource configuration parameter of the data packet sent after the $q^{th}$ data packet that fails to be transmitted within the preset time period. The preset time period is less than or equal to timing duration of the timer. The preset time period may be set based on an actual situation or experience. For example, the preset time period may be set based on the timing duration of the timer, for example, set to 4 s, 5 s, or the like.

It should be noted that the q data packets may be consecutive data packets, or may be inconsecutive data packets. If the q data packets are inconsecutive data packets, and the first device determines that q data packets fail to be transmitted accumulatively within the preset time period during running of the timer, the first device adjusts the radio resource configuration parameter used to transmit the to-be-transmitted data packet. q is a positive integer greater than 0. For example, q may be 1, 2, 3, 4, 5, or the like as specified in a 3GPP protocol.

For example, assuming that n is 3, m is 2, and q is 1, the first device obtains transmission states of first three data packets. It is assumed that a transmission state of a data packet 1 is a transmission success, and transmission states of a data packet 2 and a data packet 3 are transmission failures. In other words, if transmission states of two of the three data packets are transmission failures, the first device starts the timer. If one data packet fails to be transmitted within the preset time period in the running process of the timer (where it is assumed that the first data packet fails to be transmitted within the preset time period), the first device adjusts the radio resource configuration parameter used to transmit the to-be-transmitted data packet, and the to-be-transmitted data packet is a data packet transmitted after the first data packet within the preset time period.

Because the radio resource configuration parameter used to transmit the to-be-transmitted data packet is adjusted, it can be ensured that a data packet sent after the $q^{th}$ data packet that fails to be transmitted within the preset time period is successfully transmitted, so that interruption occurs at the application layer can be avoided as much as possible, and data transmission reliability can be improved.

Manner 2: The first device adjusts, during running of the timer, a radio resource configuration parameter used to transmit a data packet within a first time period.

Specifically, a difference between this manner and the manner 1 lies in that the first device starts to adjust the radio resource configuration parameter once the timer is started.

Because the radio resource configuration parameter used to transmit the data packet within the preset time period is adjusted, it can be ensured that the data packet transmitted within the preset time period is successfully transmitted, so that interruption occurring at the application layer can be avoided, and data transmission reliability can be improved.

Further, in the foregoing two manners, if the first device is the terminal device, and the second device is the network device, the first device may determine, in the following two manners, the radio resource configuration parameter used to transmit the subsequent data packet:

(1) The first device receives a second message from the second device, where the second message includes the to-be-adjusted parameter; and the first device adjusts, based on the to-be-adjusted parameter, the radio resource configuration parameter used to transmit the subsequent data packet.

Specifically, in this manner, after starting the timer, the terminal device sends a started state of the timer to the network device. When determining that the timer is in the started state, the network device sends the second message to the terminal device. The second message is a radio resource control (RRC) reconfiguration message.

The second message includes a to-be-adjusted parameter. The to-be-adjusted parameter is a radio resource configuration parameter reconfigured by the network device, and the to-be-adjusted parameter may include at least one of a modulation and coding scheme (MCS), a HARQ, an ARQ, a periodicity of a transmission resource, a location of a transmission resource, a size of a transmission resource, a type of a transmission resource, a priority of a logical channel, an RLC layer transmission mode of a radio bearer, a type of a radio bearer, or a transmit power. Optionally, the to-be-adjusted parameter may also include all parameters in the RRC reconfiguration message. After receiving the second message, the terminal device adjusts the radio resource configuration parameter based on the to-be-adjusted parameter in the second message. In this way, the terminal device transmits the subsequent data packet based on the adjusted radio resource configuration parameter, thereby improving a success rate of transmission of the subsequent data packet.

Optionally, the terminal device may adjust the radio resource configuration parameter in the following manners based on the to-be-adjusted parameter: adjusting the MCS, increasing a quantity of retransmissions of the HARQ, increasing a quantity of retransmissions of the ARQ, increasing the size of the transmission resource, adjusting the type of the transmission resource, increasing the priority of the logical channel, adjusting the RLC layer transmission mode of the radio bearer, adjusting the radio bearer to use duplication transmission, increasing the transmit power, or the like. Alternatively, the terminal device may also adjust a parameter in the RRC reconfiguration message. Certainly, the terminal device may alternatively adjust a priority of the subsequent data packet, for example, adjust a scheduling priority or a priority of a MAC layer packet assembly, to improve the success rate of transmission of the subsequent data packet, to avoid expiration of the timer at the application layer due to transmission failures of a plurality of data packets, and avoid interruption occurs at the application layer.

The following uses an example to describe in detail how the terminal device adjusts the radio resource configuration parameter.

For example, if the terminal device originally transmits a data packet by using a high-order MCS, where the high-order MCS may be, for example, a code rate a, and a modulation scheme is quadrature phase shift keying (QPSK), when determining that the transmission states of the m data packets in the first n data packets are transmission failures, the terminal device starts the timer and sends the started state of the timer to the network device. When determining that the timer is in the started state, the network device sends the second message to the terminal device. If the second message includes the to-be-adjusted parameter: the MCS, the terminal device adjusts a high-order MCS to a low-order MCS. For example, the low-order MCS may be a code rate b, and a modulation scheme is binary phase shift keying (BPSK), where a is greater than b. The terminal device transmits the subsequent data packet by using the adjusted low-order MCS. Because the low-order MCS has a lower code rate, a redundant bit for transmission is increased, and an increase in the redundant bit can improve a success rate of data transmission.

For example, if the quantity of the retransmissions of the HARQ originally used by the terminal device to transmit the data packet is c, when determining that the transmission states of the m data packets in the first n data packets are transmission failures, the terminal device starts the timer and sends the started state of the timer to the network device. When determining that the timer is in the started state, the network device sends the second message to the terminal device. If the second message includes the to-be-adjusted parameter: the quantity of the retransmissions of the HARQ, the terminal device may increase the quantity of the retransmissions of the HARQ to d, where d is greater than c. The terminal device transmits the subsequent data packet by using the adjusted quantity of the retransmissions of the HARQ. Because a quantity of transmissions of the data packet at the MAC layer is increased, a success rate of data transmission can be improved. It should be noted that the second message includes an increased value of the quantity of the retransmissions of the HARQ, and the terminal device may increase the quantity of the retransmissions of the HARQ based on the received second message.

For example, if the quantity of the retransmissions of the ARQ originally used by the terminal device to transmit the data packet is e, when determining that the transmission states of the m data packets in the first n data packets are transmission failures, the terminal device starts the timer and sends the started state of the timer to the network device. When determining that the timer is in the started state, the network device sends the second message to the terminal device. If the second message includes the to-be-adjusted parameter: the quantity of the retransmissions of the ARQ, the terminal device may increase the quantity of the retransmissions of the ARQ to f, where f is greater than e. The terminal device transmits the subsequent data packet by using the adjusted quantity of the retransmissions of the ARQ. Because a quantity of transmissions of the data packet at the RLC layer is increased, a success rate of data transmission can be improved. It should be noted that the second message includes an increased value of the quantity of the retransmissions of the ARQ, and the terminal device may increase the quantity of the retransmissions of the ARQ based on the received second message.

For example, if the terminal device originally transmits the data packet by using a transmission resource in the $i^{th}$ slot, when determining that the transmission states of the m data packets in the first n data packets are transmission failures, the terminal device starts the timer and sends the started state of the timer to the network device. When determining that the timer is in the started state, the network device sends the second message to the terminal device. If the second message includes the size of the transmission resource, the terminal device may transmit the subsequent data packet by using transmission resources in the $j^{th}$ slot and the $k^{th}$ slot. Sizes of the transmission resource j in the $j^{th}$ slot and the transmission resource in the $k^{th}$ slot are greater than a size of the transmission resource in the $i^{th}$ slot. Because the terminal device may transmit the subsequent data packet by using a relatively large amount of transmission resources, a probability that the data packet is successfully transmitted can be increased.

For example, if the terminal device originally transmits the data packet by using a transmission resource dynamically scheduled by the network device by using downlink control information, when determining that the transmission states of the m data packets in the first n data packets are transmission failures, the terminal device starts the timer and sends the started state of the timer to the network device. When determining that the timer is in the started state, the network device sends the second message to the terminal device. If the second message includes the type of the transmission resource, the terminal device may adjust the dynamically scheduled transmission resource by using an SPS resource configured by using higher layer signaling, and transmit the subsequent data packet by using the SPS transmission resource.

For example, if the priority of the logical channel originally used by the terminal device to transmit the data packet is g, when determining that the transmission states of the m data packets in the first n data packets are transmission failures, the terminal device starts the timer and sends the started state of the timer to the network device. When determining that the timer is in the started state, the network device sends the second message to the terminal device. If the second message includes the priority of the logical channel, the terminal device may adjust the priority of the logical channel to h, where h is less than g. Optionally, a smaller number indicates a higher priority of the logical channel. The terminal device transmits the subsequent data packet by using the adjusted priority of the logical channel. Because the priority of the logical channel is increased, a probability of successfully transmitting the data packet can be increased.

For example, if the terminal device originally transmits the data packet in the RLC UM transmission mode, when determining that the transmission states of the m data packets in the first n data packets are transmission failures, the terminal device starts the timer and sends the started state of the timer to the network device. When determining that the timer is in the started state, the network device sends the second message to the terminal device. If the second message includes the transmission mode of the radio bearer, the terminal device may adjust the transmission mode of the radio bearer from the RLC UM transmission mode to the RLC AM transmission mode, and transmit the subsequent data packet in the RLC AM transmission mode. Because the RLC AM transmission mode includes the ARQ function, transmission reliability of the subsequent data packet can be improved.

For example, if the terminal device does not originally enable duplication transmission, when determining that the transmission states of the m data packets in the first n data packets are transmission failures, the terminal device starts the timer and sends the started state of the timer to the network device. When determining that the timer is in the started state, the network device sends the second message to the terminal device. If the second message indicates to enable the duplication transmission, the terminal device may adjust the radio bearer to enable the duplication transmission to transmit the subsequent data packet. Because the terminal device transmits the subsequent data packet in a manner of duplication transmission, a success rate of data transmission can be improved.

For example, if the transmit power originally used by the terminal device to transmit the data packet is x mW, when determining that the transmission states of the m data packets in the first n data packets are transmission failures, the terminal device starts the timer and sends the started state of the timer to the network device. When determining that the timer is in the started state, the network device sends the second message to the terminal device. If the second message includes the transmit power, the terminal device may increase the transmit power from original x mW to y mW, where y is greater than x. The terminal device transmits the subsequent data packet by using the increased transmit power. Because the transmit power is increased, a probability of successfully transmitting the data packet can be increased.

In addition, adjusting a parameter in the RRC reconfiguration message may include adjusting another parameter in an information element (IE), namely, an RRC bearer configuration (Bearer Config), in 3GPP 38.331 or an IE, namely, a radio resource configuration dedicated, in 3GPP 36.331.

(2) The first device adjusts, based on first parameter information configured by the second device, the radio resource configuration parameter used to transmit the subsequent data packet.

Specifically, during an initial configuration, the network device may configure two sets of parameter information for a DRB and a service flow, which are respectively a first parameter information and a second parameter information. After starting the timer, the terminal device may adjust the radio resource configuration parameter based on the first parameter information, to transmit, based on the adjusted radio resource configuration parameter, the data packet within the preset time period during running of the timer.

In addition, the terminal device may further adjust, based on the second parameter information configured by the second device, the radio resource configuration parameter used to transmit a data packet when the timer is in a disabled state. Specifically, when the timer is in the disabled state, the terminal device adjusts the radio resource configuration parameter based on the second parameter information preconfigured by the network device, to transmit, based on the adjusted radio resource configuration parameter, the data packet when the timer is in the disabled state.

It should be noted that the radio resource configuration parameter adjusted based on the second parameter information may be the same as or different from the radio resource configuration parameter used to transmit the data packet before the timer is started.

Further, the network device may also adjust the MCS, increase the quantity of the retransmissions of the HARQ, increase the quantity of the retransmissions of the ARQ, increase the size of the transmission resource, adjust the type of the transmission resource, increase the priority of the logical channel, adjust the RLC layer transmission mode of the radio bearer, adjust the radio bearer to use duplication transmission, increase the transmit power, or the like in the foregoing manner. Alternatively, the terminal device may also adjust the parameter in the RRC reconfiguration message. For a process in which the network device adjusts the to-be-adjusted parameter, refer to the foregoing descriptions. Details are not described herein again.

In another possible implementation, after the first device starts the timer, the first device sends the first message to the second device. The first message is used to indicate the state of the timer. After receiving the first message, the second device determines, based on the state of the timer, the radio resource configuration parameter used to transmit the subsequent data packet.

Specifically, the first message may be, for example, an RRC message, or may be a MAC control element (MAC CE), or may be downlink control information (DCI). A specific form of the first message is not limited in this embodiment of this application. The state of the timer includes a state of whether the timer is started.

When the second device determines, based on the first message, that the timer is in the started state, the second device determines the radio resource configuration parameter used to transmit the subsequent data packet. A manner in which the second device determines the radio resource configuration parameter is similar to the foregoing manner in which the first device determines the radio resource configuration parameter. Details are not described herein again. If the second device determines, based on the first message, that the timer is not in the started state, the second device does not adjust the radio resource configuration parameter used to transmit the subsequent data packet, that is, transmits the subsequent data packet by using an original radio resource configuration parameter.

Further, if the first device is the terminal device, the second device is the network device, and the third device is the core network device, the first device may further send fifth indication information to the second device or the third device. The fifth indication information includes a parameter of the timer corresponding to a radio bearer or a QoS service flow.

Specifically, the parameter of the timer may include duration of the timer, a protocol layer entity that maintains the timer, and/or the like. The terminal device may send, to the network device or the core network device, the parameter of the timer corresponding to the radio bearer or the QoS service flow, so that the network device or the core network device configures and maintains the timer based on the parameter of the timer.

In a possible implementation, if the first device determines that p data packets are successfully transmitted within the preset time period during running of the timer, the first device processes the timer in any one of the following manners: resetting, stop, suspension, or interruption. p is a positive integer, and may be, for example, 2, 3, or 4.

Specifically, when determining that the transmission states of the m data packets in the first n data packets are transmission failures, the first device starts the timer. If the p data packets are successfully transmitted within the preset time period in the running process of the timer, the first device does not adjust the radio resource configuration parameter used to transmit the subsequent data packet. In addition, the first device resets, stops, suspends, or interrupts the timer.

Resetting of the timer means that the timer is resumed to an initial setting (for example, be cleared) and keeps running. In this case, the timer maintains in an active state, but restarts timing. For example, when one timer is timing, a value of the timer is increased by 1 every second. When the value of the timer is 4 currently, and the value of the timer is 5 in a next second, the value of the timer changes to 0 after the timer is reset. To be specific, the timer immediately changes from a state in which the value of the counter is 4 to a state in which the value of the timer is 0. However, the timer keeps running, and one second later, the value of the timer changes from 0 to 1. In addition, resetting of the timer may also be referred to as restart of the timer.

Stop of the timer may also be referred to as termination of the timer, and means that the timer is resumed to an initial setting and stops running. In this case, the timer changes from an active state to an inactive state, and can only be restarted subsequently. For example, the value of the timer is supposed to change to 5 in the next second. If an action of the timer currently is to stop, the value of the timer changes to 0 and the timer stops running, and the timer no longer changes with time. If the timer stops and runs again, the timer needs to be restarted.

Suspension of the timer may also be referred to as interruption/breaking off of the timer, and means that the timer is not cleared and stops running. In this case, the timer changes from an active state to an inactive state, but maintains a current state, and may be resumed to run. For example, the value of the timer currently is 4 and is supposed to change to 5 in the next second. If an action of the timer currently is to suspend, interrupt, or break off, the value of the timer remains 4 and the timer stops running. In this case, the timer no longer changes with the time. When the timer is suspended, interrupted, or broke off and then runs again, the timer needs to be resumed or recovered.

Because the first device determines that the p data packets are successfully transmitted within the preset time period during running of the timer, the first device processes the timer in any one of resetting, stop, suspension, or interruption, to avoid interruption occurs at the application layer due to expiration of the timer.

In a possible implementation, if the first device determines that at least p data packets are not successfully transmitted within the preset time period during running of the timer, the first device releases the radio bearer or the QoS service flow.

When the network device determines that a quantity of data packets that are successfully transmitted during running of the timer is less than p, or a quantity of data packets that are incorrectly transmitted is greater than q, the network device sends an RRC reconfiguration message to the terminal device. The RRC reconfiguration message includes release indication information of a radio bearer corresponding to the service, to indicate to release the bearer corresponding to the service.

In another possible implementation, if the first device is the terminal device, when the terminal device determines that the p data packets are not successfully transmitted within the preset time period during running of the timer, the terminal device initiates a random access procedure.

When the terminal device determines that a quantity of data packets that are successfully transmitted during running of the timer is less than p, or a quantity of data packets that are incorrectly transmitted is greater than q, the terminal device re-initiates a random access procedure. The terminal device sends a random access preamble to the network device. After receiving the preamble, the network device sends a random access response message to the terminal device, and the random access response message includes uplink grant information. Further, the terminal device may send uplink data or an RRC message on a resource indicated in an uplink grant. The RRC message may be an RRC connection establishment request message, an RRC connection reestablishment request message, or an RRC connection resume request message.

According to the communication method provided in this embodiment of this application, the first device obtains the transmission states of the first n data packets by using the first protocol layer entity, where the first protocol layer entity includes the RLC layer entity or the entity above the RLC layer; the first device starts the timer if the transmission states of the m data packets in the first n data packets are transmission failures, where n and m are both positive integers, and m is less than or equal to n; and the first device determines the radio resource configuration parameter used to transmit the subsequent data packet, or sends the first message to the second device, where the first message is used to indicate the state of the timer, and the state of the timer is used to determine the radio resource configuration parameter used to transmit the subsequent data packet. Because the first device determines that the transmission states of the m data packets in the first n data packets are transmission failures, the first device starts the timer, and adjusts the radio resource configuration parameter of the subsequent data packet transmitted in the running process of the timer, to improve a success rate of data packet transmission. In this way, interruption occurring at the application layer can be avoided, and data transmission reliability can be improved.

Figure 3:
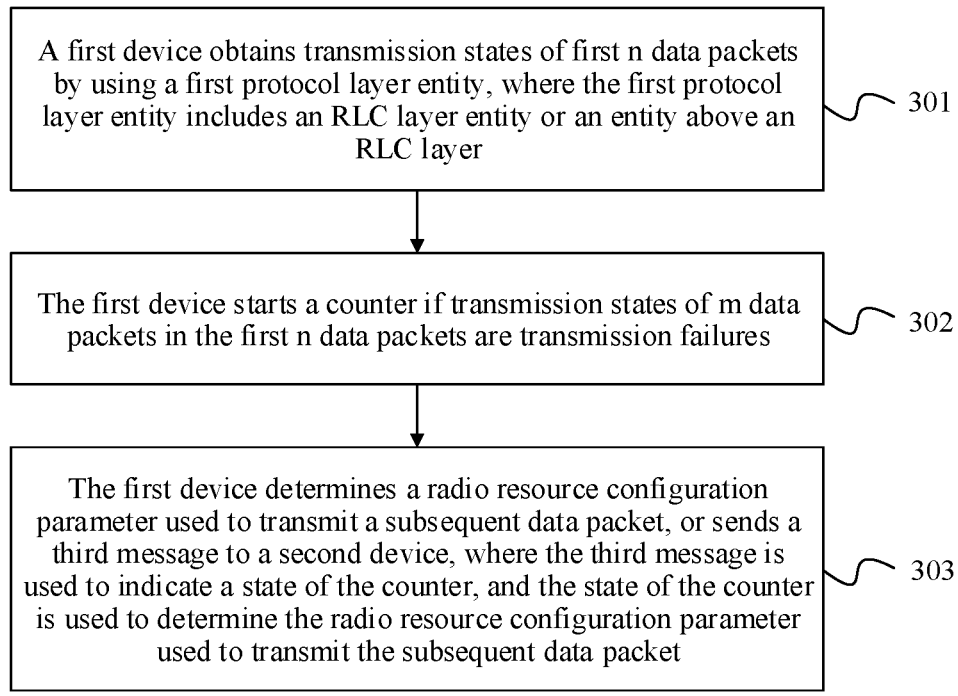
FIG. 3 is another schematic flowchart of a data transmission method according to this application.

FIG. 3 is another schematic flowchart of a data transmission method according to this application. Based on the system architecture shown in FIG. 1, as shown in FIG. 3, the method in this embodiment may include the following steps.

Step 301: A first device obtains transmission states of first n data packets by using a first protocol layer entity, where the first protocol layer entity includes an RLC layer entity or an entity above an RLC layer. For a process in which the first device obtains the transmission states of the first n data packets by using the first protocol layer entity, refer to related descriptions in the foregoing embodiment. Details are not described herein again.

Step 302: The first device starts a counter if transmission states of m data packets in the first n data packets are transmission failures.

n and m are both positive integers, and m is less than or equal to n.

For the m data packets, refer to related descriptions in the foregoing embodiment. Details are not described again.

The first device starts the counter if the first device determines that the transmission states of the m data packets in the first n data packets are transmission failures. A threshold of the counter may be set based on an actual situation. For example, the threshold of the counter may be specified in advance or set in advance. The counter may count incrementally. For example, an initial value is 0. Each time a data packet that fails to be transmitted is determined, the counter is increased by 1. When the counter reaches a threshold X, it is considered that the counter overflows. Alternatively, an initial value of the counter may be set to X (where X is a non-zero positive integer). Each time a data packet that fails to be transmitted is determined, the counter is decreased by 1, and overflow occurs when the counter reaches a threshold 0. The threshold of the counter is not limited herein in this embodiment of this application.

Start of the counter means that the counter changes from an inactive state to an active state and starts to run.

Optionally, if the first device is a terminal device, before starting the counter, the first device receives fourth indication information from a second device or a third device. The fourth indication information includes a parameter of the counter corresponding to a radio bearer or a QoS service flow.

Specifically, the second device may be a network device, and the third device may be a core network device. The parameter of the counter may include a specified threshold of the counter, a protocol layer entity that maintains the counter, and/or the like. The terminal device receives, from the network device or the core network device, the parameter of the counter corresponding to the radio bearer or the QoS service flow, to start the counter based on the parameter of the counter, and maintain the counter based on the protocol layer entity that maintains the counter.

Step 303: The first device determines a radio resource configuration parameter used to transmit a subsequent data packet, or sends a third message to the second device, where the third message is used to indicate a state of the counter, and the state of the counter is used to determine the radio resource configuration parameter used to transmit the subsequent data packet.

For the radio resource configuration parameter, refer to related descriptions in the foregoing embodiment. Details are not described herein again.

In a possible implementation, after the first device starts the counter, the first device determines the radio resource configuration parameter used to transmit the subsequent data packet in the counting process of the counter.

When the first device adjusts the radio resource configuration parameter used to transmit the subsequent data packet may be determined in the following manners:

Manner 1: When the first device determines that q data packets fail to be transmitted within a preset time period during counting of the counter, the first device adjusts a radio resource configuration parameter used to transmit a to-be-transmitted data packet, where the to-be-transmitted data packet is a data packet sent after the $q^{th}$ data packet that fails to be transmitted within the preset time period, and q is a positive integer greater than 0.

Specifically, when determining that the transmission states of the m data packets in the first n data packets are transmission failures, the first device starts the counter. If the q data packets fail to be transmitted within the preset time period in the counting process of the counter, the first device adjusts the radio resource configuration parameter of the data packet sent after the $q^{th}$ data packet that fails to be transmitted within the preset time period. The preset time period is less than or equal to counting duration of the counter. The preset time period may be set based on an actual situation or experience. For example, the preset time period may be set based on the counting duration of the counter, for example, set to 4 s, 5 s, or the like. The counting duration of the counter is duration from a moment at which the counter starts to count to a moment at which the counter overflows.

Manner 2: The first device adjusts, during running of the counter, a radio resource configuration parameter used to transmit a data packet within a first time period.

Specifically, a difference between this manner and the manner 1 lies in that the first device starts to adjust the radio resource configuration parameter once the counter is started.

Further, for a specific manner in which the first device determines the radio resource configuration parameter used to transmit the subsequent data packet, refer to related descriptions in the foregoing embodiment.

In addition, after the first device starts the counter, the first device sends a third message to the second device. The third message is used to indicate a state of the counter. After receiving the third message, the second device determines, based on the state of the counter, the radio resource configuration parameter used to transmit the subsequent data packet.

Specifically, the third message may be, for example, an RRC message, or may be a MAC CE, or may be DCI. A specific form of the third message is not limited in this embodiment of this application. In addition, the state of the counter includes a state of whether the counter is started, namely, a state of whether the counter starts to count.

When the second device determines, based on the third message, that the counter is in the started state, the second device determines the radio resource configuration parameter used to transmit the subsequent data packet. A manner in which the second device determines the radio resource configuration parameter is similar to the foregoing manner in which the first device determines the radio resource configuration parameter. Details are not described herein again. If the second device determines, based on the third message, that the counter is not in the started state, the second device does not adjust the radio resource configuration parameter used to transmit the subsequent data packet, that is, transmits the subsequent data packet by using an original radio resource configuration parameter.

Further, if the first device is the terminal device, the second device is the network device, and the third device is the core network device, the first device may further send fifth indication information to the second device or the third device. The fifth indication information includes a parameter of the counter corresponding to a radio bearer or a QoS service flow.

Specifically, the parameter of the counter may include a set threshold of the counter, a protocol layer entity that maintains the counter, and/or the like. The terminal device may send, to the network device or the core network device, the parameter of the counter corresponding to the radio bearer or the QoS service flow, so that the network device or the core network device configures and maintains the counter based on the parameter of the counter.

In a possible implementation, if the first device determines that p data packets are successfully transmitted within the preset time period in the counting process of the counter, the first device processes the counter in any one of the following manners: resetting, stop, suspension, or interruption. p is a positive integer, and may be, for example, 2, 3, or 4.

Specifically, when determining that the transmission states of the m data packets in the first n data packets are transmission failures, the first device starts the counter. If the p data packets are successfully transmitted within the preset time period in the running process of the counter, the first device does not adjust the radio resource configuration parameter used to transmit the subsequent data packet. In addition, the first device resets, stops, suspends, or interrupts the counter.

Resetting the counter means that the counter is resumed to an initial setting (for example, be cleared, or be resumed to a maximum value) and keeps running. In this case, the timer maintains in an active state, but restarts counting. An example in which the value of the counter is incremented is used for description. When one counter is counting, a value of the counter is increased by 1 each time a data packet that fails to be transmitted is determined. When the value of the counter currently is 4, the value of the counter changes to 0 after the counter is reset. To be specific, the counter immediately changes from a state in which the value of the counter is 4 to a state in which the value of the counter is 0. However, the counter keeps running, and after another data packet that fails to be transmitted is determined, the value of the counter changes from 0 to 1. In addition, resetting of the counter may also be referred to as restart of the counter.

Stop of the counter may also be referred to as termination of the counter, and means that the counter is resumed to initial setting and stops running. In this case, the counter changes from an active state to an inactive state, and can only be restarted subsequently. For example, after the counter determines a data packet that fails to be transmitted next time, the value of the counter is supposed to change to 5. If an action of the counter currently is to stop, the value of the counter changes to 0 and the counter stops running, and the counter no longer changes with time. If the counter stops and runs again, the counter needs to be restarted.

Suspension of the counter may also be referred to as interruption/breaking off of the counter, and means that the counter is not cleared and stops running. In this case, the counter changes from an active state to an inactive state, but maintains a current state, and may be resumed to run. For example, a value of the counter currently is 4. After a data packet that fails to be transmitted is determined next time, the value of the counter is supposed to change to 5. If an action currently performed by the counter is to suspend, interrupt, or break off, the value of the counter remains 4 and the counter stops running. In this case, the counter no longer changes with time. When the counter is suspended, interrupted, or broke off and then runs again, the counter needs to be resumed or recovered.

Because the first device determines that the p data packets are successfully transmitted within the preset time period during running of the counter, the first device processes the counter in any one of resetting, stop, suspension, or interruption, to avoid interruption occurs at the application layer due to overflow of the counter.

An embodiment of this application further provides a communication method. In the method, a first device obtains transmission states of first n data packets by using a first protocol layer entity, where the first protocol layer entity includes an RLC layer entity or an entity above an RLC layer; the first device starts a counter (where the counter is increased by 1 or decreased by 1) if transmission states of m data packets in the first n data packets are transmission failures, where n and m are both positive integers, and m is less than or equal to n; and the first device determines a radio resource configuration parameter used to transmit a subsequent data packet, or sends a third message to a second device, where the third message is used to indicate a value of the counter, and the value of the counter is used to determine the radio resource configuration parameter used to transmit the subsequent data packet. Because the first device determines that the transmission states of the m data packets in the first n data packets are transmission failures, the first device starts the counter, and adjusts the radio resource configuration parameter of the subsequent data packet transmitted in a counting process of the counter, to improve a success rate of data packet transmission. In this way, interruption occurring at the application layer can be avoided, and data transmission reliability can be improved.

The following describes in detail the communication method in this application by using an example in which the first device is a terminal device, the second device is a network device, and the first protocol layer entity is a PDCP layer entity.

Optionally, the network device pre-configures, for the terminal device in advance, at least two sets of radio resource configuration parameters used to transmit a subsequent data packet.

Optionally, it is assumed that a value of m configured by a core network device is 1. Because only the value of m is configured, the terminal device also considers a value of n as 1 by default. After the PDCP layer entity of the terminal device completes initialization, it is determined that a transmission state of a previous data packet is not a transmission failure (where when the first data packet is transmitted after initialization, it is considered by default that transmission states of all data packets before the first data packet are transmission successes). In this case, the first PDCP PDU is sent by using the first set of radio resource configuration parameters, and a corresponding PDCP SN is #1.

The PDCP layer entity of the terminal device may obtain a transmission state of the PDCP PDU #1 based on an indication of an RLC layer or a MAC layer of the PDCP layer entity, or may obtain a transmission state of the PDCP PDU #1 based on indication information, for example, a PDCP status report, sent by a PDCP layer entity of the network device. In addition, the RLC layer may obtain a transmission state of each PDCP PDU based on the RLC status report, and the MAC layer may obtain the transmission state of each PDCP PDU based on an ACK/a NACK in a HARQ process, the PDCP status report sent by the PDCP layer entity of the network device includes an SN of at least one PDCP PDU and a transmission state corresponding to the at least one PDCP PDU.

It is assumed that the PDCP layer entity of the terminal device learns that the transmission state of the PDCP PDU #1 is a transmission success. Because the transmission state of the previous data packet is not a transmission failure, the timer is not started.

Next, the PDCP layer entity of the terminal device may obtain a transmission state of a PDCP PDU #2 by using an indication of the RLC layer or the MAC layer of the PDCP layer entity, or may obtain a transmission state of a PDCP PDU #2 by using indication information, for example, a PDCP status report, sent by the PDCP layer entity of the network device.

It is assumed that a transmission state that is of the PDCP PDU #2 and that is obtained by the PDCP layer entity of the terminal device is a transmission failure. Specifically, transmission may fail within a maximum quantity of retransmissions of a HARQ and/or a maximum quantity of retransmissions of an ARQ. Because the transmission state of the previous data packet is a transmission failure, the timer is started (where the timer changes to an active state), and the terminal device transmits a PDCP PDU #3 by using the second set of radio resource configuration parameters, or the terminal device reports a state (the active state) of the timer to the network device. Optionally, the network device sends the third set of radio resource configuration parameters to the terminal device based on the state of the timer of the terminal device. After receiving the third set of radio resource configuration parameters, the terminal device transmits a subsequent PDCP PDU by using the third set of radio resource configuration parameters.

The PDCP layer entity of the terminal device transmits the PDCP PDU #3 by using the second set of the radio resource configuration parameters or the third set of radio resource configuration parameters. If the terminal device learns, in the foregoing manner, that the transmission state of the PDCP PDU #3 is a transmission success, the timer is terminated (where the timer changes to an inactive state), or the terminal device reports the state (the inactive state) of the timer to the network device. Optionally, the network device sends the fourth set of radio resource configuration parameters to the terminal device based on the state of the timer of the terminal device. After receiving the fourth set of radio resource configuration parameters, the terminal device transmits a subsequent PDCP PDU by using the fourth set of radio resource configuration parameters.

It should be noted that the PDCP layer entity of the terminal device may obtain a value of n and/or a value of m from the network device or the core network device, or the terminal device may obtain the value of n and/or the value of m and a length of the timer from an application layer or a non-access stratum of the terminal device, the network device may obtain the value of n and/or the value of m and the length of the timer through reporting by the terminal device or configuring by the core network device. If the core network device configures only the value of the parameter m, it indicates that the value of n is the same as the value of m, that is, a first entity starts the timer only when determining that the transmission state of the first 1 (m=1) data packet is a transmission failure or the transmission states of m (m≥2) consecutive data packets are transmission failures.

Optionally, assuming that the value of m configured by the core network device is 2, after the PDCP layer entity of the terminal device completes initialization, it is determined that transmission states of first two data packet are not transmission failures (where when the first data packet is transmitted after initialization, it is considered by default that transmission states of all data packets before the first data packet are transmission successes). In this case, the first PDCP PDU is sent by using the first set of radio resource configuration parameters, and the corresponding PDCP SN is #1.

The PDCP layer entity of the terminal device may obtain the transmission state of the PDCP PDU #1 by using the foregoing method. It is assumed that the transmission state of the PDCP PDU #1 is a transmission success. Because the transmission states of the first two consecutive data packets are not transmission failures, the timer is not started, and the first set of radio resource configuration parameters may continue to be used to transmit the PDCP PDU #2.

Next, the PDCP layer entity of the terminal device obtains the transmission state of the PDCP PDU #2 by using the foregoing method. It is assumed that the transmission state of the PDCP PDU #2 is a transmission failure. Specifically, transmission may fail within a maximum quantity of retransmissions of a HARQ and/or a maximum quantity of retransmissions of an ARQ. Because the transmission states of the first two consecutive data packets are transmission failures, the timer is still not started, and the first set of radio resource configuration parameters may continue to be used to transmit the PDCP PDU #3.

The PDCP layer entity of the terminal device obtains the transmission state of the PDCP PDU #3 by using the foregoing method. It is assumed that the transmission state of the PDCP PDU #3 is a transmission failure. Because the transmission states of the foregoing two consecutive data packets are transmission failures (where both the PDCP PDU #2 and the PDCP PDU #3 are transmission failures), the terminal device starts the timer, and transmits the PDCP PDU #4 by using the second set of radio resource configuration parameters, or the terminal device reports the state (the active state) of the timer to the network device. The network device sends the third set of radio resource configuration parameters to the terminal device based on the state of the timer of the terminal device. After receiving the third set of radio resource configuration parameters, the terminal device transmits the subsequent PDCP PDU #4 by using the third set of radio resource configuration parameters.

In a running process of the timer, if the terminal device receives an indication message indicating that the PDCP PDU #4 is successfully transmitted, the terminal device controls the timer to stop.

Optionally, it is assumed that the value of m configured by the core network device is 2, and n is 3. When transmitting a PDCP PDU whose SN is #k, the PDCP layer entity of the terminal device determines transmission states of three data packets, namely, a PDCP PDU #(k−1), a PDCP PDU #(k−2), and a PDCP PDU (k−3), before the PDCP PDU #k. If transmission states of at least two data packets (for example, the PDCP PDU #(k−1) and the PDCP PDU (k−3)) are transmission failures, the radio resource configuration parameter is adjusted in the foregoing manner, or the state of the timer is reported to the network device, so that the subsequent data packet is transmitted based on the adjusted radio resource configuration parameter or a radio resource configuration parameter delivered by the network device.

It should be noted that, when the transmission states of the m data packets in the first n data packets are transmission failures, a manner in which the terminal device starts the counter to adjust the radio resource configuration parameter used to transmit the subsequent data packet is similar to a manner in which the terminal device starts the timer to adjust the radio resource configuration parameter used to transmit the subsequent data packet. Details are not described herein again.

According to the communication method provided in this embodiment of this application, the first device obtains the transmission states of the first n data packets by using the first protocol layer entity, where the first protocol layer entity includes the RLC layer entity or the entity above the RLC layer; the first device starts the timer if the transmission states of the m data packets in the first n data packets are transmission failures, where n and m are both positive integers, and m is less than or equal to n; and the first device determines the radio resource configuration parameter used to transmit the subsequent data packet, or sends the first message to the second device, where the first message is used to indicate the state of the timer, and the state of the timer is used to determine the radio resource configuration parameter used to transmit the subsequent data packet. Because the first device determines that the transmission states of the m data packets in the first n data packets are transmission failures, the first device starts the timer, and adjusts the radio resource configuration parameter of the subsequent data packet transmitted in the running process of the timer, to improve a success rate of data packet transmission. In this way, interruption occurring at the application layer can be avoided, and data transmission reliability can be improved.

The foregoing describes the communication method provided in the embodiments of this application, and the following describes a first device provided in the embodiments of this application.

Figure 4:
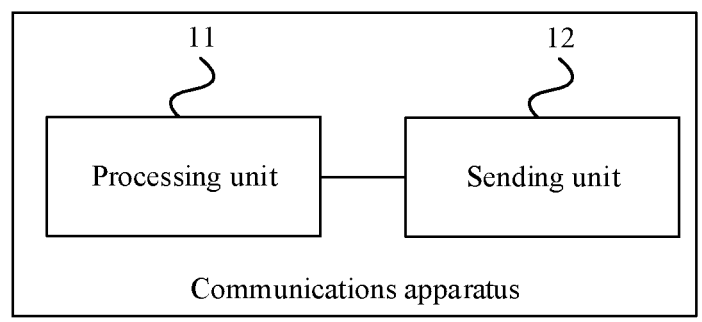
FIG. 4 is a schematic structural diagram of a communications apparatus according to an embodiment of this application.

FIG. 4 is a schematic structural diagram of a communications apparatus according to an embodiment of this application. The apparatus may be a first device or a chip or a system-on-a-chip in the first device, and may be configured to perform actions related to the first device in the foregoing method embodiments. The apparatus includes a processing unit 11 and a sending unit 12, where the processing unit 11 is configured to obtain transmission states of first n data packets by using a first protocol layer entity, where the first protocol layer entity includes a radio link control RLC layer entity or an entity above an RLC layer;

the processing unit 11 is further configured to start a timer when transmission states of m data packets in the first n data packets are transmission failures, where n and m are both positive integers, and m is less than or equal to n;

the processing unit 11 is further configured to determine a radio resource configuration parameter used to transmit a subsequent data packet; or the sending unit 12 is configured to send a first message to a second device, where the first message is used to indicate a state of the timer, and the state of the timer is used to determine the radio resource configuration parameter used to transmit the subsequent data packet.

According to the communications apparatus provided in this embodiment of this application, the processing unit 11 obtains the transmission states of the first n data packets by using the first protocol layer entity, where the first protocol layer entity includes the RLC layer entity or the entity above the RLC layer; the processing unit 11 starts the timer if the transmission states of the m data packets in the first n data packets are transmission failures, where n and m are both positive integers, and m is less than or equal to n; and the processing unit 11 determines the radio resource configuration parameter used to transmit the subsequent data packet, or the sending unit 12 sends the first message to the second device, where the first message is used to indicate the state of the timer, and the state of the timer is used to determine the radio resource configuration parameter used to transmit the subsequent data packet. Because the processing unit 11 determines that the transmission states of the m data packets in the first n data packets are transmission failures, the processing unit 11 starts the timer, and adjusts the radio resource configuration parameter of the subsequent data packet transmitted in a running process of the timer, to improve a success rate of data packet transmission. In this way, interruption occurring at the application layer can be avoided, and data transmission reliability can be improved.

Optionally, the processing unit 11 is specifically configured to:

when determining that q data packets fail to be transmitted within a preset time period during running of the timer, adjust a radio resource configuration parameter used to transmit a to-be-transmitted data packet, where the to-be-transmitted data packet is a data packet sent after the $q^{th}$ data packet that fails to be transmitted within the preset time period, and q is a positive integer greater than 0; or adjust, during running of the timer, a radio resource configuration parameter used to transmit a data packet within the preset time period.

Optionally, the processing unit 11 obtains a transmission state of each data packet based on one of the following information by using the first protocol layer entity:

if the timer maintained by the apparatus by using the first protocol layer entity does not expire and the data packet is successfully transmitted, the apparatus determines that the transmission state of the data packet is a transmission success; otherwise, the apparatus determines that the transmission state of the data packet is a transmission failure;

a second device sends first indication information to the first protocol layer entity of the apparatus by using the first protocol layer entity, where the first indication information is used to indicate that the data packet is successfully transmitted or fails to be transmitted;

the apparatus sends second indication information to the first protocol layer entity of the apparatus by using a second protocol layer entity, where the second indication information is used to indicate that the data packet is successfully transmitted or fails to be transmitted;

the second device sends third indication information to the first protocol layer entity of the apparatus by using a second protocol layer entity, where the third indication information is used to indicate that the data packet is successfully transmitted or fails to be transmitted;

the second device obtains, by using the first protocol layer entity or by using a second protocol layer entity, sequence numbers of all received data packets, and if the second device determines that the sequence number of the data packet is missing, determines that the data packet fails to be transmitted; or the second device learns of a transmission latency based on quality of service QoS information by using the first protocol layer entity or by using a second protocol layer entity;

and if the data packet is not correctly transmitted within the transmission latency, determines that the data packet fails to be transmitted.

Figure 5:
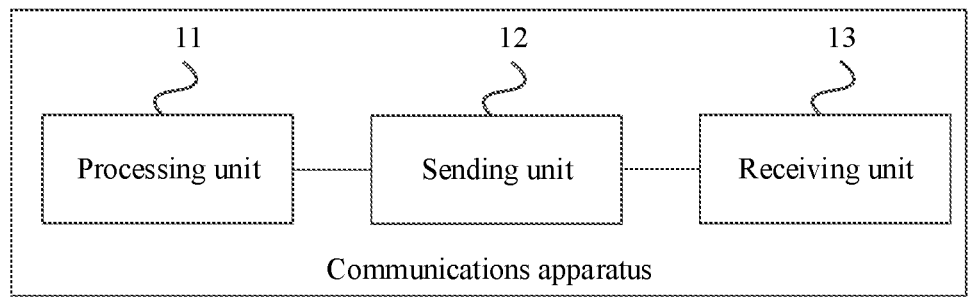
FIG. 5 is a schematic structural diagram of another communications apparatus according to an embodiment of this application.

FIG. 5 is a schematic structural diagram of another communications apparatus according to an embodiment of this application. Referring to FIG. 5, the apparatus is a terminal device, and the second device is a network device. The apparatus further includes a receiving unit 13, where the receiving unit 13 is further configured to receive fourth indication information from the second device or a third device, and the fourth indication information includes a parameter of the timer corresponding to a radio bearer or a QoS service flow.

Optionally, the apparatus is a terminal device, and the second device is a network device; and the sending unit 12 is further configured to send fifth indication information to the second device or a third device, and the fifth indication information includes a parameter of the timer corresponding to a radio bearer or a QoS service flow.

Optionally, the apparatus is a terminal device, and the second device is a network device; and the processing unit 11 is specifically configured to:

adjust, based on first parameter information configured by the second device, the radio resource configuration parameter used to transmit the subsequent data packet.

Optionally, the apparatus is a terminal device, and the second device is a network device; and the processing unit 11 is specifically configured to:

adjust, based on second parameter information configured by the second device, the radio resource configuration parameter used to transmit a data packet when the timer is in a disabled state.

Optionally, the apparatus is a terminal device, and the second device is a network device; and the processing unit 11 is specifically configured to:

receive a second message from the second device, where the second message includes a to-be-adjusted parameter; and adjust, based on the to-be-adjusted parameter, the radio resource configuration parameter used to transmit the subsequent data packet.

The communications apparatus provided in this embodiment of this application may perform the foregoing corresponding method embodiment. The implementation principles and the technical effects of the communications apparatus are similar to those in the method embodiment. Details are not described herein again.

It should be noted that, it should be understood that, division into the units of the apparatus is merely logical function division. During actual implementation, all or some of the units may be integrated into a physical entity, or the units may be physically separate. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, the sending unit may be a processing element disposed separately, or may be integrated into a chip of the apparatus for implementation. In addition, the sending unit may be stored in a memory of the apparatus in a form of a program, and invoked by a processing element of the apparatus to perform the function of the sending unit. Implementation of other units is similar. In addition, all or some of the units may be integrated together, or may be implemented independently. The processing element described herein may be an integrated circuit with a signal processing capability. In an implementation process, steps in the method or the units can be implemented by using a hardware integrated logical circuit in the processing element, or by using instructions in a form of software. In addition, the foregoing sending unit is a sending control unit, and may send information through a sending apparatus of the apparatus, for example, an antenna and a radio frequency apparatus.

The foregoing units may be one or more integrated circuits configured to perform the foregoing method, for example, one or more application-specific integrated circuits (ASIC), one or more microprocessors (DSP), or one or more field programmable gate arrays (FPGA). For another example, when one of the foregoing units is implemented by a processing element scheduling a program, the processing element may be a general-purpose processor, for example, a central processing unit (CPU) or another processor that can invoke a program. For still another example, the units may be integrated and implemented in a form of a system-on-a-chip (SOC).

Figure 6:
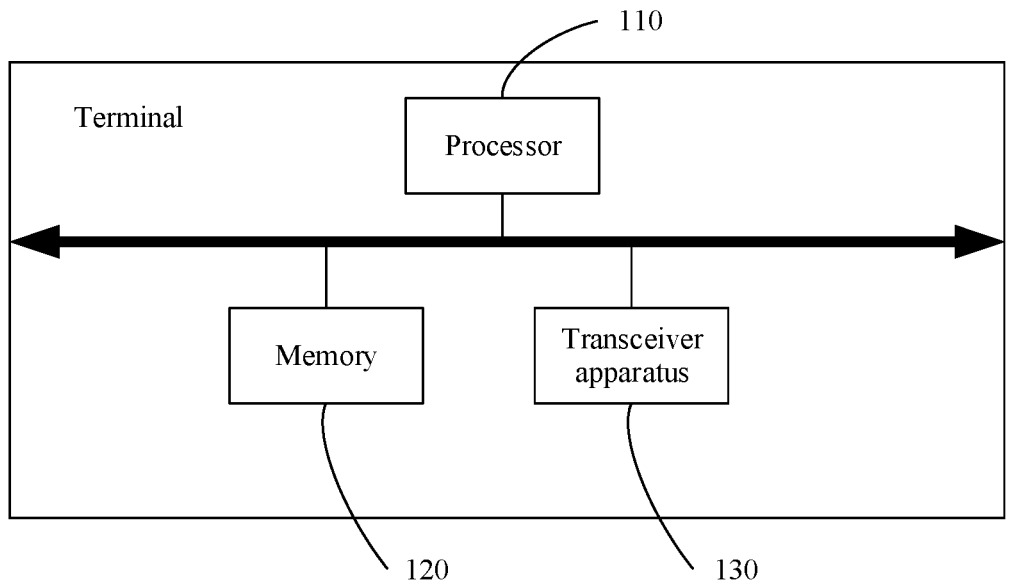
FIG. 6 is a schematic structural diagram of a terminal according to an embodiment of this application.

FIG. 6 is a schematic structural diagram of a terminal according to an embodiment of this application. As shown in FIG. 6, the terminal includes a processor 110, a memory 120, and a transceiver apparatus 130. The transceiver apparatus 130 may be connected to an antenna. In a downlink direction, the transceiver apparatus 130 receives, through the antenna, information sent by a base station, and sends the information to the processor 110 for processing. In an uplink direction, the processor 110 processes data of the terminal, and sends the data to the base station through the transceiver apparatus 130.

The memory 120 is configured to store a program for implementing the foregoing method embodiment or the modules in the embodiment shown in FIG. 4 or FIG. 5. The processor 110 invokes the program to perform the operations in the foregoing method embodiment, to implement the modules shown in FIG. 4 or FIG. 5.

Alternatively, some or all of the foregoing modules may be implemented in a form of an integrated circuit that is embedded in a chip of the terminal. In addition, the modules may be separately implemented, or may be integrated together. The foregoing units may be configured as one or more integrated circuits for implementing the foregoing method, for example, one or more application-specific integrated circuits (ASIC), one or more microprocessors (DSP), or one or more field programmable gate arrays (FPGA).

Figure 7:
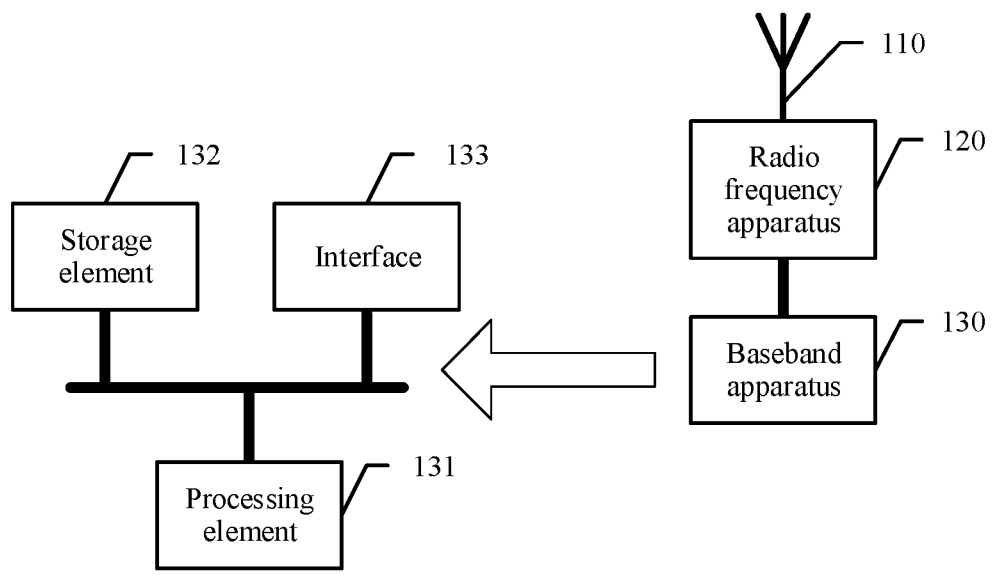
FIG. 7 is a schematic structural diagram of a base station according to an embodiment of this application.

FIG. 7 is a schematic structural diagram of a base station according to an embodiment of this application. As shown in FIG. 7, the base station includes an antenna 110, a radio frequency apparatus 120, and a baseband apparatus 130. The antenna 110 is connected to the radio frequency apparatus 120. In an uplink direction, the radio frequency apparatus 120 receives, through the antenna 110, information sent by a terminal, and sends, to the baseband apparatus 130 for processing, the information sent by the terminal. In a downlink direction, the baseband apparatus 130 processes the information of the terminal and sends the information to the radio frequency apparatus 120, and the radio frequency apparatus 120 processes the information of the terminal and then sends the information to the terminal through the antenna 110.

In an implementation, the foregoing modules are implemented in a form of a processing element scheduling a program. For example, the baseband apparatus 130 includes a processing element 131 and a storage element 132, and the processing element 131 invokes a program stored in the storage element 132, to perform the method in the foregoing method embodiment. In addition, the baseband apparatus 130 may further include an interface 133, configured to exchange information with the radio frequency apparatus 120. The interface is, for example, a common public radio interface (CPRI).

In another implementation, the foregoing modules may be configured as one or more processing elements to implement the foregoing method, and the processing elements are arranged on the baseband apparatus 130. The processing element herein may be an integrated circuit, for example, one or more ASICs, one or more DSPs, or one or more FPGAs. The integrated circuits may be integrated together to form a chip.

For example, the foregoing modules may be integrated together and implemented in a form of a system-on-a-chip (SOC). For example, the baseband apparatus 130 includes an SOC chip, configured to implement the foregoing method. The processing element 131 and the storage element 132 may be integrated into the chip, and the processing element 131 invokes the program stored in the storage element 132, to implement the foregoing method or functions of the foregoing units. Alternatively, at least one integrated circuit may be integrated in the chip to implement the foregoing method or functions of the foregoing units. Alternatively, with reference to the foregoing implementations, functions of some units are implemented in a form of a processing element invoking a program, and functions of some units are implemented in a form of an integrated circuit.

Regardless of a manner, the base station includes at least one processing element, a storage element, and a communications interface, and the at least one processing element is configured to perform the method provided in the foregoing method embodiment. The processing element may perform some or all of the steps in the foregoing method embodiment in a first manner, that is, in a manner of executing the program stored in the storage element, or in a second manner, that is, in a manner of using an integrated logic circuit of hardware in the processor element in combination with an instruction. Certainly, the method according to the foregoing method embodiment may also be performed in combination with the first manner and the second manner.

The processing element herein is the same as that described above, may be a general-purpose processor, for example, a central processing unit (CPU), or may be one or more integrated circuits configured to implement the foregoing method, for example, one or more application-specific integrated circuits (ASIC), one or more microprocessors (DSP), or one or more field programmable gate arrays (FPGA).

The storage element may be a memory, or may be a general name of a plurality of storage elements.

This application further provides a storage medium, including a readable storage medium and a computer program. The computer program is used to implement the communication method provided in any one of the foregoing embodiments.

This application further provides a program product, where the program product includes a computer program (namely, executable instructions), and the computer program is stored in a readable storage medium. At least one processor of a first device may read the computer program from the readable storage medium, and the at least one processor executes the computer program, so that the first device performs the communication method provided in the foregoing various implementations.

An embodiment of this application further provides a communications apparatus, including at least one storage element and at least one processing element. The at least one storage element is configured to store a program. When the program is executed, the communications apparatus is enabled to perform an operation of the first device in any one of the foregoing embodiments.

All or some of the steps of the method embodiments may be implemented by hardware related to a program instruction. The foregoing program may be stored in a readable memory. When the program is executed, the steps in the foregoing method embodiments are performed. The foregoing memory (storage medium) includes: a read-only memory (ROM), a random access memory (RAM), a flash memory, a hard disk, a solid-state drive, a magnetic tape, a floppy disk, an optical disc, and any combination thereof.

What is claimed is:

1. A communication method, comprising:
   obtaining, by a first device, transmission states of n data packets by using a first protocol layer entity, wherein the first protocol layer entity comprises a radio link control (RLC) layer entity or an entity above an RLC layer;
   starting, by the first device, a timer based on the transmission states of m data packets in the n data packets being transmission failures, wherein n and m are both positive integers, and m is less than or equal to n; and
   based on the first device determining that q data packets fail to be transmitted within a preset time period during running of the timer, adjusting, by the first device, a radio resource configuration parameter for transmitting a subsequent data packet, wherein the subsequent data packet is transmitted after the $q^{th}$ data packet that failed to be transmitted within the preset time period, and q is a positive integer greater than 0;
   wherein adjusting the radio resource configuration parameter comprises at least one of the following:
   adjusting a modulation and coding scheme (MCS);
   increasing a quantity of retransmissions of a hybrid automatic repeat request (HARQ);
   increasing a quantity of retransmissions of an automatic repeat request (ARQ);
   increasing a size of a transmission resource;
   adjusting a type of a transmission resource;
   increasing a priority of a logical channel;
   adjusting an RLC layer transmission mode of a radio bearer;
   adjusting a radio bearer to use duplication transmission; or
   increasing a transmit power.

2. The method according to claim 1, wherein obtaining the transmission state of each respective data packet of the n data packets comprises:
   (a) based on the timer not expiring and the respective data packet being successfully transmitted, determining, by the first device, that the transmission state of the respective data packet is a transmission success;

(b) based on the timer expiring and the respective data packet not having been successfully transmitted, determining that the transmission state of the respective data packet is a transmission failure; or (c) receiving, by the first device from a second device, indication information through the first protocol layer entity, wherein the indication information indicates that the respective data packet was successfully transmitted or failed to be transmitted.

3. The method according to claim 1, wherein the first device is a terminal device; and wherein the first device receives indication information from a second device, wherein the indication information comprises a parameter of the timer corresponding to a radio bearer or a quality of service (QoS) service flow.

4. The method according to claim 1, wherein the first device is a terminal device; and wherein the first device sends indication information to a second device, wherein the indication information comprises a parameter of the timer corresponding to a radio bearer or a quality of service (QoS) service flow.

5. The method according to claim 1, wherein the first device is a terminal device; and wherein adjusting the radio resource configuration parameter is based on parameter information configured by a second device.

6. The method according to claim 1, wherein the first device is a terminal device; and wherein adjusting the radio resource configuration parameter is performed while the timer is in a disabled state.

7. The method according to claim 1, wherein the first device is a terminal device; and wherein adjusting the radio resource configuration parameter is based on a to-be-adjusted parameter comprised in a message received by the first device from a second device.

8. An apparatus, comprising:
a processor; and
a memory storing instructions;
wherein the processor is configured to execute the instructions to facilitate performance of the following by the apparatus:
obtaining transmission states of n data packets by using a first protocol layer entity, wherein the first protocol layer entity comprises a radio link control (RLC) layer entity or an entity above an RLC layer;
starting a timer based on the transmission states of m data packets in the n data packets being transmission failures, wherein n and m are both positive integers, and m is less than or equal to n; and
adjusting, during running of the timer, a radio resource configuration parameter for transmitting a subsequent data packet within a preset time period;
wherein adjusting the radio resource configuration parameter comprises at least one of the following:
adjusting a modulation and coding scheme (MCS);
increasing a quantity of retransmissions of a hybrid automatic repeat request (HARQ);
increasing a quantity of retransmissions of an automatic repeat request (ARQ);
increasing a size of a transmission resource;
adjusting a type of a transmission resource;
increasing a priority of a logical channel;
adjusting an RLC layer transmission mode of a radio bearer;
adjusting a radio bearer to use duplication transmission; or
increasing a transmit power.

9. The apparatus according to claim 8, wherein obtaining the transmission state of each respective data packet of the n data packets comprises:

(a) based on the timer not expiring and the respective data packet being successfully transmitted, determining that the transmission state of the respective data packet is a transmission success;

(b) based on the timer expiring and the respective data packet not having been successfully transmitted, determining that the transmission state of the respective data packet is a transmission failure; or (c) receiving, from a second device, indication information through the first protocol layer entity, wherein the indication information indicates that the respective data packet was successfully transmitted or failed to be transmitted.

10. The apparatus according to claim 8, wherein the apparatus is a terminal device; and wherein the processor is further configured to execute the instructions to facilitate performance of the following by the apparatus: receiving indication information from a second device, wherein the indication information comprises a parameter of the timer corresponding to a radio bearer or a quality of service (QoS) service flow.

11. The apparatus according to claim 8, wherein the apparatus is a terminal device; and wherein the processor is further configured to execute the instructions to facilitate performance of the following by the apparatus: sending indication information to a second device, wherein the indication information comprises a parameter of the timer corresponding to a radio bearer or a quality of service (QoS) service flow.

12. The apparatus according to claim 8, wherein the apparatus is the terminal device; and wherein adjusting the radio resource configuration parameter is based on parameter information configured by a second device.

13. The apparatus according to claim 8, wherein the apparatus is the terminal device; and wherein adjusting the radio resource configuration parameter is performed while the timer is in a disabled state.

14. The apparatus according to claim 8, wherein the apparatus is the terminal device; and wherein adjusting the radio resource configuration parameter is based on a to-be-adjusted parameter comprised in a message received from a second device.

15. The method according to claim 1, wherein adjusting the radio resource configuration parameter comprises:
switching from a high-order MCS having a first code rate and a quadrature phase shift keying (QPSK) modulation scheme to a low-order MCS having a second code rate lower than the first code rate and a binary phase shift keying (BPSK) modulation scheme.

16. The method according to claim 1, wherein adjusting the radio resource configuration parameter comprises:
increasing the quantity of retransmissions of the HARQ or the quantity of retransmissions of the ARQ.

17. The method according to claim 1, wherein adjusting the radio resource configuration parameter comprises:
switching from using a transmission resource in an $i^{th}$ slot to using transmission resources in a $j^{th}$ slot and a $k^{th}$ slot, wherein sizes of the transmission resources in the $j^{th}$ slot and the $k^{th}$ slot are greater than a size of the transmission resource in the $i^{th}$ slot.

18. The method according to claim 1, wherein adjusting the radio resource configuration parameter comprises:
   switching from using a transmission resource dynamically scheduled by the network device via downlink control information to using a semi-persistent scheduling (SPS) resource configured via higher layer signaling.

19. The method according to claim 1, wherein adjusting the radio resource configuration parameter comprises:
   increasing the priority of the logical channel.

20. The method according to claim 1, wherein adjusting the radio resource configuration parameter comprises:
   switching from an RLC unacknowledged mode (UM) transmission mode to an RLC acknowledged mode (AM) transmission mode.

* * * * *